US009836199B2

(12) United States Patent
Ishino et al.

(10) Patent No.: US 9,836,199 B2
(45) Date of Patent: Dec. 5, 2017

(54) USER INTERFACE DEVICE AND DISPLAY OBJECT OPERATING METHOD

(71) Applicant: Panasonic Intellectual Property Corporation of America, Torrance, CA (US)

(72) Inventors: Kouichi Ishino, Tokyo (JP); Yoshiteru Tanaka, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 8 days.

(21) Appl. No.: 14/422,936

(22) PCT Filed: Mar. 31, 2014

(86) PCT No.: PCT/JP2014/001871
§ 371 (c)(1),
(2) Date: Feb. 20, 2015

(87) PCT Pub. No.: WO2014/207971
PCT Pub. Date: Dec. 31, 2014

(65) Prior Publication Data
US 2015/0242101 A1    Aug. 27, 2015

(30) Foreign Application Priority Data

Jun. 26, 2013  (JP) .................. 2013-134054

(51) Int. Cl.
*G06F 3/048* (2013.01)
*G06F 3/0484* (2013.01)
(Continued)

(52) U.S. Cl.
CPC .......... *G06F 3/04845* (2013.01); *G06F 3/017* (2013.01); *G06F 3/0304* (2013.01);
(Continued)

(58) Field of Classification Search
CPC ..................... G06F 3/0488; G06F 3/04883
See application file for complete search history.

(56) References Cited

U.S. PATENT DOCUMENTS 6,346,929 B1    2/2002  Fukushima et al.
7,893,920 B2    2/2011  Endoh
(Continued)

FOREIGN PATENT DOCUMENTS

CN    102725783    10/2012
JP    8-006708     1/1996
(Continued)

OTHER PUBLICATIONS

Leap Motion, YouTube, May 21, 2012, https://www.youtube.com/watch?v=MYgsAMKLu7s.
(Continued)

*Primary Examiner* — William Bashore
*Assistant Examiner* — Rayeez Chowdhury
(74) *Attorney, Agent, or Firm* — Wenderoth, Lind & Ponack, L.L.P.

(57) ABSTRACT

A user interface device includes: a display unit which displays a two-dimensional or a three-dimensional display object in a display space; a sensor unit which measures 3D coordinates of fingers of a user in the display space; a motion detecting unit which detects motion of the fingers of the user relative to the display object based on the 3D coordinates of the fingers of the user measured by the sensor unit; and a display control unit which changes display content displayed by the display unit, according to a detection result obtained by the motion detecting unit.

11 Claims, 17 Drawing Sheets

(51) Int. Cl.
G06F 3/01 (2006.01)
G06F 3/03 (2006.01)
G06F 3/0483 (2013.01)
G06F 3/0481 (2013.01)
G06K 9/00 (2006.01)
G06T 7/246 (2017.01)
G06T 7/73 (2017.01)

(52) U.S. Cl.
CPC ........ G06F 3/0483 (2013.01); G06F 3/04815 (2013.01); G06F 3/04842 (2013.01); G06K 9/00355 (2013.01); G06K 9/00389 (2013.01); G06T 7/251 (2017.01); G06T 7/75 (2017.01); *G06T 2207/10016* (2013.01); *G06T 2207/10028* (2013.01); *G06T 2207/30196* (2013.01)

(56) References Cited

U.S. PATENT DOCUMENTS

| | | | |
|---|---|---|---|
| 8,786,518 | B2 | 7/2014 | Ueno et al. |
| 2005/0248529 | A1 | 11/2005 | Endoh |
| 2006/0277469 | A1* | 12/2006 | Chaudhri ............ G06F 3/04817 715/709 |
| 2008/0198141 | A1* | 8/2008 | Lee ..................... G06F 3/04883 345/173 |
| 2008/0282202 | A1* | 11/2008 | Sunday ................ G06F 3/0483 715/863 |
| 2011/0018821 | A1* | 1/2011 | Kii ....................... G06F 1/1616 345/173 |
| 2011/0191718 | A1* | 8/2011 | Hinckley ............... G06F 3/048 715/835 |
| 2011/0209039 | A1* | 8/2011 | Hinckley ........... G06F 3/04883 715/206 |
| 2012/0092333 | A1 | 4/2012 | Matsuda |
| 2012/0159386 | A1* | 6/2012 | Kang ................... G06F 3/0481 715/800 |
| 2012/0235947 | A1 | 9/2012 | Yano et al. |
| 2012/0317510 | A1* | 12/2012 | Noda .................. G06F 3/04815 715/782 |
| 2013/0050061 | A1* | 2/2013 | Ueno ..................... A63F 13/10 345/1.3 |
| 2014/0353336 | A1* | 12/2014 | Zaporski .............. B65D 75/585 222/107 |

FOREIGN PATENT DOCUMENTS

| | | |
|---|---|---|
| JP | 2005-031799 | 2/2005 |
| JP | 2005-321870 | 11/2005 |
| JP | 2010-257359 | 11/2010 |
| JP | 2012-256110 | 12/2012 |
| JP | 2013-047924 | 3/2013 |

OTHER PUBLICATIONS

Introducing the Leap Motion, YouTube, May 21, 2012, https://www.youtube.com./watch?v=_d6KuiutelA.

International Search Report (ISR) issued Jun. 17, 2014 in International (PCT) Application No. PCT/JP2014/001871.

Hiroshi Kawade et al., "Development of AR-based information presentation device considering interaction with real objects and virtual objects", ITE Technical Report, vol. 35, No. 9, pp. 59-63, Feb. 14, 2011, together with English translation thereof.

Kazuki Tokuda et al., "Function Design and Implementation of Document-Metaphor Interface for Tabletop Systems", Proceedings of the 2012 IEICE Central Conference—Engineering Sciences Society, pp. 223, Mar. 6, 2012, together with English translation thereof.

Toshiki Saito et al., "Implementation and Evaluations of Flicking Gesture Recognition with a High-Speed Camera", Transactions of Virtual Reality Society of Japan, vol. 12. No. 3, pp. 355-364, Sep. 30, 2007, together with English translation thereof.

Office Action dated Sep. 25, 2017 in the corresponding Chinese Patent Application No. 201480002144.9 with partial English translation.

* cited by examiner

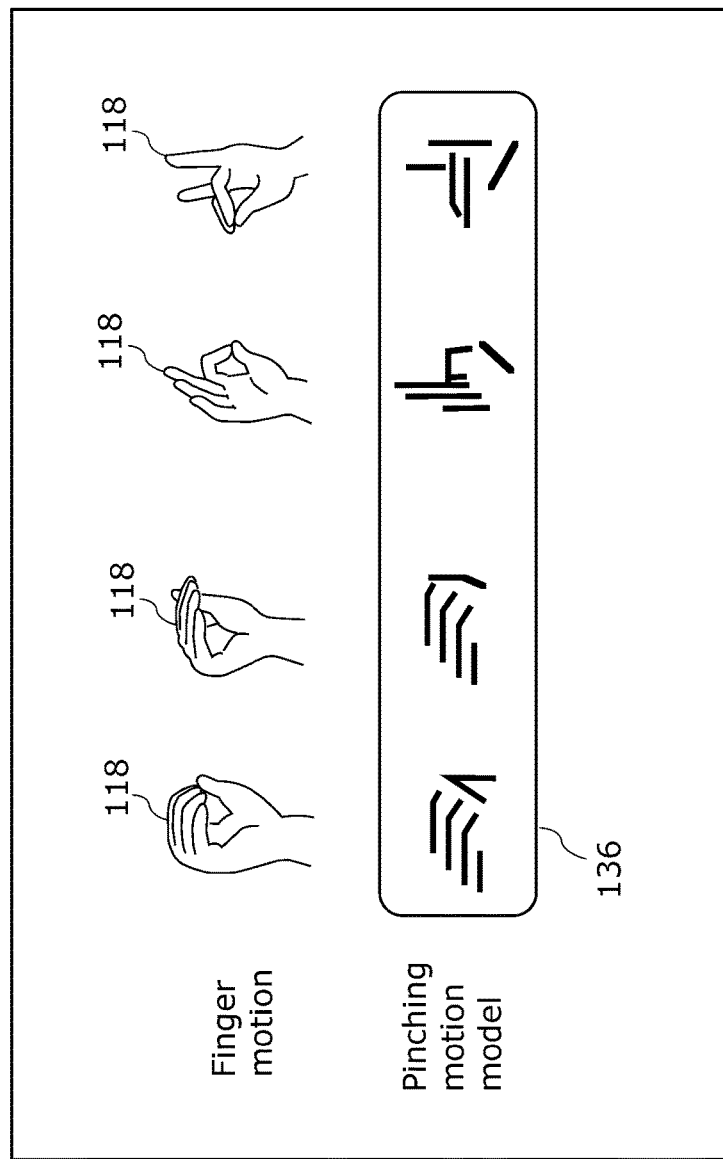

Display object
(Cross-sectional view)
117

USER INTERFACE DEVICE AND DISPLAY OBJECT OPERATING METHOD

TECHNICAL FIELD

The present invention relates to a user interface device and a display object operating method for a display object in three-dimensional (3D) imaging.

BACKGROUND ART

Patent Literature 1 (PTL 1) discloses a technique related to a method of performing a detailed operation on a display object with user's fingers in 3D imaging. In the technique disclosed in PTL 1, a user performs an operation with a glove including markers. A user interface device detects pinching motion based on the distance between the markers of two fingers.

CITATION LIST

Patent Literature

[PTL 1] Japanese Unexamined Patent Application Publication No. 2012-256110

SUMMARY OF INVENTION

It is desirable that such a user interface device accurately detect motion of the user.

An object of the present invention is to provide a user interface device capable of accurately detecting motion of the user.

A user interface device according to one aspect of the present invention includes: a display unit which displays an object in a display space, the object being either a two-dimensional (2D) object or a three-dimensional 3D) object; a sensor unit which measures 3D coordinates of fingers of a user in the display space; a motion detecting unit which detects motion of the fingers of the user relative to the object, based on the 3D coordinates of the fingers of the user measured by the sensor unit; and a display control unit which changes display content displayed by the display unit, according to a detection result obtained by the motion detecting unit.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

The present invention provides a user interface device capable of accurately detecting motion of the user.

BRIEF DESCRIPTION OF DRAWINGS

FIG. 5 illustrates an example of pinching motion models according to the embodiment.

DETAILED DESCRIPTION OF INVENTION

Figure 1:
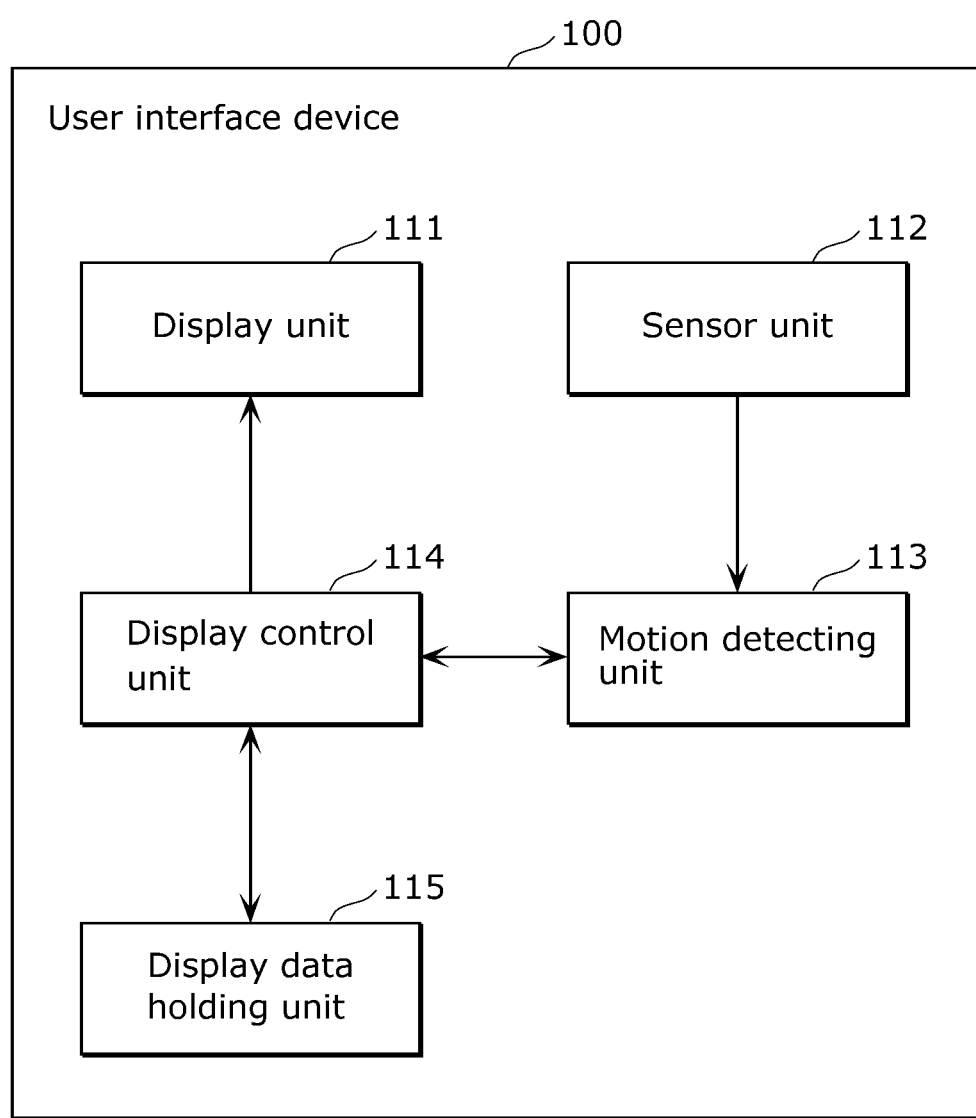
FIG. 1 is a block diagram of a user interface device according to an embodiment.

Underlying Knowledge Forming Basis of the Present Invention

In relation to the user interface device disclosed in the Background Art section, the inventors have found the following problem:

The configuration disclosed in PTL 1 poses a burden on a user of putting on a glove. Moreover, in the configuration of PTL 1, only the planar positions of the fingertips are detected but the positions in the depth direction are not detected. Accordingly, depending on the positions of the fingers, even when the user is not actually performing pinching motion, the distance between the markers may be determined to be close. As described above, the inventors have found that the technique of PTL 1 involves false detection of pinching motion.

In the following embodiment, a description is given of a user interface device capable of detecting pinching motion of a user without requiring the user to put markers on their fingers, and also capable of accurately detecting the pinching motion. Moreover, a description is given of a user interface device which allows the user to perform an intuitive operation on a display object in 3D imaging.

A user interface device according to one aspect of the present invention includes: a display unit which displays an object in a display space, the object being either a two-dimensional (2D) object or a three-dimensional (3D) object; a sensor unit which measures 3D coordinates of fingers of a user in the display space; a motion detecting unit which detects motion of the fingers of the user relative to the object, based on the 3D coordinates of the fingers of the user measured by the sensor unit; and a display control unit which changes display content displayed by the display unit, according to a detection result obtained by the motion detecting unit.

With this configuration, the user interface device measures the 3D coordinates of the fingers of the user, and detects motion of the fingers of the user based on the 3D coordinates. Accordingly, the user interface device is capable of accurately detecting motion of the user.

For example, it may be that the motion detecting unit detects pinching motion in which the user pinches the object, based on the 3D coordinates of the fingers of the user measured by the sensor unit.

With this configuration, the user interface device is capable of accurately detecting pinching motion based on the measured 3D coordinates of the fingers of the user.

For example, it may be that when the motion detecting unit detects the pinching motion, the display control unit changes a display manner of a target object pinched by the pinching motion.

With this configuration, the user is capable of easily determining whether or not the pinching motion has been performed appropriately.

For example, it may be that the display unit displays a plurality of the objects in the display space, and when the motion detecting unit detects the pinching motion, the display control unit further changes a display manner of the plurality of the objects excluding the target object.

With this configuration, the user interface device is capable of relatively emphasizing the target object by, for example, making objects other than the target object less noticeable. Moreover, for example, in an input operation continuously performed on the target object, it is possible to reduce a case where display of the other objects hinders the input operation.

For example, it may be that when the motion detecting unit detects moving motion in which the user pinches and moves the target object, the display control unit moves a 3D position of the target object in accordance with the moving motion.

With this configuration, the user interface device allows the user to perform an intuitive input operation as an operation for moving an object.

For example, it may be that when the motion detecting unit detects tearing or ripping motion in which the user tears or rips the target object, the display control unit deletes the target object.

With this configuration, the user interface device allows the user to perform an intuitive input operation as an operation for deleting an object.

For example, it may be that when the motion detecting unit detects enlarging motion in which the user enlarges the target object while pinching two points of the target object, the display control unit enlarges the target object, and when the motion detecting unit detects reducing motion in which the user reduces the target object while pinching two points of the target object, the display control unit reduces the target object.

With this configuration, the user interface device allows the user to perform an intuitive input operation as an operation for enlarging and reducing an object.

For example, it may be that when the motion detecting unit detects page-turning motion in which the user turns a page of the target object while pinching the target object, the display control unit turns the page of the target object.

With this configuration, the user interface device allows the user to perform an intuitive input operation as an operation for turning a page of an object.

For example, it may be that when the motion detecting unit detects flicking motion in which the user flicks the target object with the fingers of the user, the display control unit moves the target object in a direction in which the target object has been flicked.

With this configuration, the user interface device allows the user to perform an intuitive input operation as an operation for moving an object.

For example, it may be that the motion detecting unit generates a finger motion model by determining portions of a part of the user which are narrower than a predetermined threshold to be the fingers, and detect the pinching motion based on the finger motion model.

With this configuration, the user interface device is capable of accurately detecting pinching motion based on the finger motion models.

For example, it may be that the motion detecting unit detects a 3D position of each of fingertips of the user based on the finger motion model, and when a portion of the target object is present between the fingertips and a distance between the fingertips is less than or equal to a thickness of the target object, the motion detecting unit determines that the pinching motion has been performed.

With this configuration, the user interface device is capable of accurately detecting pinching motion.

For example, it may be that when the finger motion model has a shape which matches a shape of a predetermined pinching motion model, the motion detecting unit determines that the pinching motion has been performed.

With this configuration, the user interface device is capable of accurately detecting pinching motion.

Moreover, a display object operating method according to one aspect of the present invention includes: displaying an object in a display space, the object being either a two-dimensional (2D) object or a three-dimensional (3D) object; measuring 3D coordinates of fingers of a user in the display space; detecting motion of the fingers of the user relative to the object, based on the 3D coordinates of the fingers of the user measured in the measuring; and changing display content according to a detection result obtained in the detecting.

With this, the display object operating method measures the 3D coordinates of the fingers of the user, and detects the motion of the fingers of the user based on the 3D coordinates. Accordingly, the display object operating method accurately detects motion of the user.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, an embodiment will be described with reference to the accompanying Drawings. The embodiment described below shows a specific example of the present invention. The numerical values, shapes, materials, structural elements, the arrangement and connection of the structural elements, steps, the processing order of the steps etc. shown in the following embodiment are mere examples, and therefore do not limit the present invention. Among the structural elements in the following embodiment, structural elements not recited in any one of the independent claims defining the most generic part of the present invention are described as arbitrary structural elements.

Embodiment

FIG. 1 is a block diagram illustrating a configuration of a user interface device 100 according to the present embodiment.

The user interface device 100 illustrated in FIG. 1 includes a display unit 111, a sensor unit 112, a motion detecting unit 113, a display control unit 114, and a display data holding unit 115.

The display unit 111 displays a stereoscopic image including a two-dimensional (2D) or 3D display object in a display space 116 which is a given region in a space. Here, the stereoscopic image is, for example, a mid-air display or a hologram. The stereoscopic image may be, of course, an image displayed on a 3D television and the like. The 2D object is, for example, a stereoscopically displayed object having no thickness.

Figure 2:
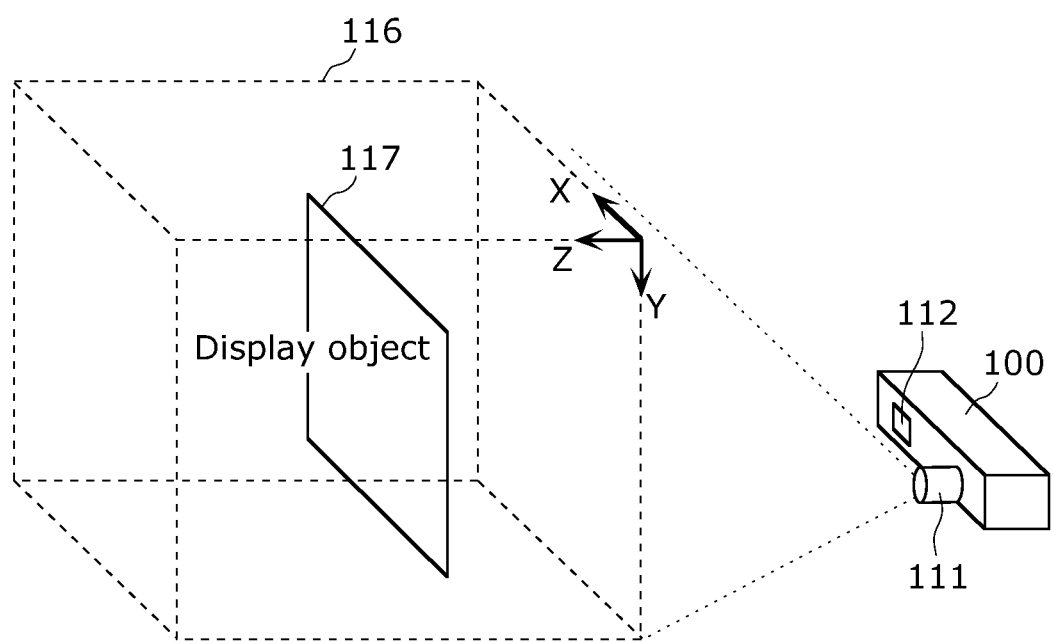
FIG. 2 schematically illustrates the user interface device according to the embodiment.

FIG. 2 schematically illustrates the user interface device 100 according to the present embodiment. The display space 116 is a spatial region in which a stereoscopic image is displayed by the display unit 111. A display object 117 is an image displayed in the display space 116 by the display unit 111. Here, only one display object 117 is illustrated, but the number of display objects 117 may be two or more. The layout of the display unit 111 and the sensor unit 112 need not be the one illustrated in FIG. 2.

The display unit 111 projects and displays a 2D or 3D image in a given region in a space under the control of the display control unit 114.

The sensor unit 112 measures the 3D coordinates of an object in the display space 116. For example, the sensor unit 112 measures the 3D coordinates of the fingers of the user in the display space 116. Specifically, the sensor unit 112 is a device which captures an image of the display space 116 to obtain a 2D image of the display space 116, and measures the distance between an object in the display space 116 and the sensor unit 112. For example, the sensor unit 112 is a sensor device which obtains an RGB image and a near-infrared region image of the display space 116. The sensor unit 112 measures the distance between the sensor unit 112 and an object in the RGB image based on the obtained near-infrared region image. Alternatively, the sensor unit 112 is a time-of-flight (TOF) range imaging sensor device. In this case, the sensor unit 112 can perform range measurement for each pixel. The sensor unit 112 may also include imaging sensors in a stereo arrangement to measure the distance with a stereo method.

The image data including the measured distance information is provided to the motion detecting unit 113.

The motion detecting unit 113 detects the motion of the fingers of the user relative to the display object 117 based on the 3D coordinates of the fingers of the user measured by the sensor unit 112. Specifically, the motion detecting unit 113 detects pinching motion in which the user pinches the display object 117, based on the 3D coordinates.

Figure 3:
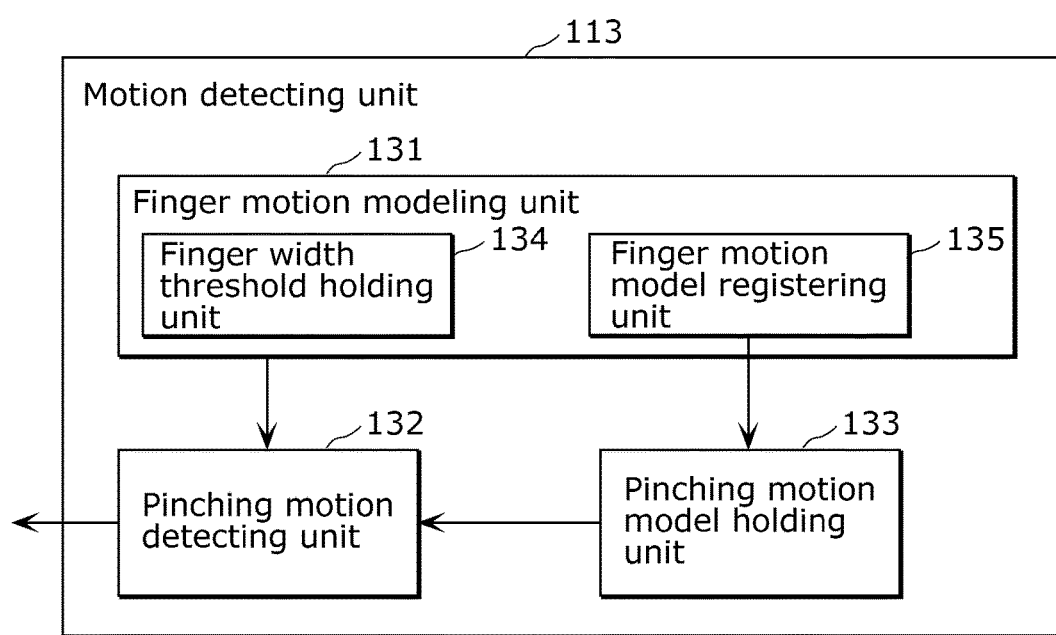
FIG. 3 is a block diagram of a motion detecting unit according to the embodiment.

FIG. 3 is a block diagram illustrating a configuration of the motion detecting unit 113. The motion detecting unit 113 includes a finger motion modeling unit 131, a pinching motion detecting unit 132, and a pinching motion model holding unit 133.

The finger motion modeling unit 131 includes a finger width threshold holding unit 134 and a finger motion model registering unit 135.

Figure 4A:
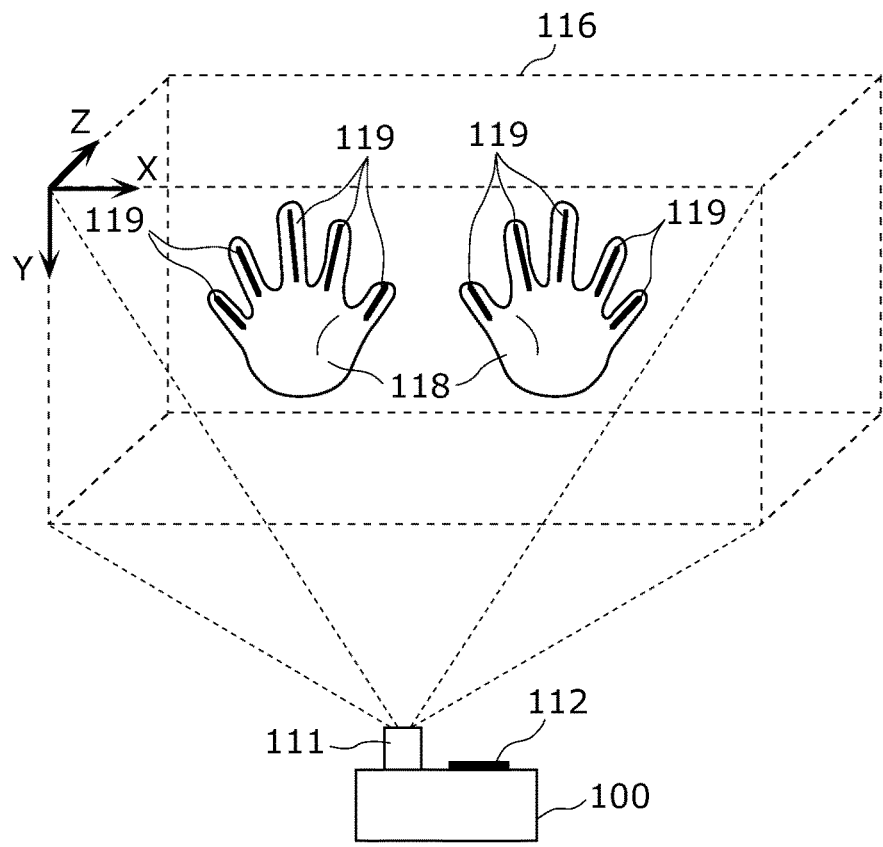
FIG. 4A schematically illustrates finger motion modeling according to the embodiment.
Figure 4B:
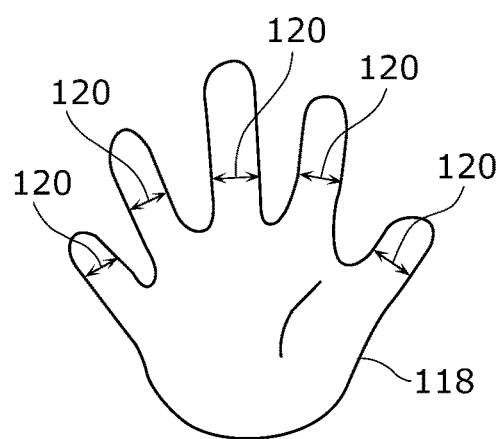
FIG. 4B schematically illustrates the finger motion modeling according to the embodiment.

As FIG. 4A illustrates, when hands 118 of the user are present in the display space 116, the finger motion modeling unit 131 generates finger motion models 119 which are schematic models of the fingers of the user, based on information provided from the sensor unit 112. Specifically, the finger motion modeling unit 131 identifies parts corresponding to the hands 118 of the user, based on the information measured by the sensor unit 112. Next, the finger motion modeling unit 131 determines, portions of the identified parts which are narrower than a predetermined threshold to be fingers. Specifically, as illustrated in FIG. 4B, the finger motion modeling unit 131 determines portions having a width 120 less than a threshold held in the finger width threshold holding unit 134 to be fingers. The threshold held in the finger width threshold holding unit 134 may be changeable by the user. For example, the finger motion modeling unit 131 sets longitudinal center lines of portions having a width 120 less than the threshold as the finger motion models 119.

The generating processing of the finger motion models 119 is repeatedly performed at predetermined time intervals. In other words, the finger motion models 119 are continuously updated on a real-time basis. The finger motion models 119 may be generated by using, for example, detection results of the finger motion models 119 in an immediately previous frame. Accordingly, even when a given finger is partially or entirely hidden by another finger and the like, the finger motion model 119 of the hidden finger can be estimated.

Information on the finger motion models 119 generated by the finger motion modeling unit 131 is provided to the pinching motion detecting unit 132 and the finger motion model registering unit 135.

The finger motion model registering unit 135 detects pinching motion performed by the hands 118 of the user and generates pinching motion models 136 in advance. The pinching motion models 136 are reference models to be used to determine whether or not pinching motion is being performed. The finger motion model registering unit 135 holds the generated pinching motion models 136 in the pinching motion model holding unit 133. FIG. 5 illustrates an example of the pinching motion models. The pinching motion models 136 illustrated in FIG. 5 is an example, but may be other than the example.

In the pinch detecting operation to be described later, pattern matching is performed between the pinching motion models 136 held in the pinching motion model holding unit 133 and the finger motion models 119. Specifically, in order to perform pinch detection, the pinching motion models 136 need to be registered in the user interface device 100 before performing the pinch detection by using the user interface device 100.

The finger motion model registering unit 135 may hold externally provided pinching motion models 136 in the pinching motion model holding unit 133.

The pinching motion model holding unit 133 holds the pinching motion models 136 generated by the finger motion model registering unit 135 and provides the pinching motion models 136 to the pinching motion detecting unit 132.

The pinching motion detecting unit 132 detects pinching motion based on the finger motion models 119 generated by the finger motion modeling unit 131 and the pinching motion models 136 provided from the pinching motion model holding unit 133. The pinching motion detecting unit 132 detects pinch position coordinates which are the 3D coordinates of the position pinched by the pinching motion. The pinching motion detecting unit 132 notifies the display control unit 114 of the detection of the pinching motion. After the detection of the pinching motion, the pinching motion detecting unit 132 also provides to the display control unit 114 information indicating a change in pinch position coordinates moved according to the motion of the user.

The display control unit 114 provides to the display unit 111 the display object information held in the display data holding unit 115. The display control unit 114 changes the display content of the pinched display object, according to the change in pinch position coordinates, and provides display data after the change to the display unit 111. Specifically, the display control unit 114 changes the display content displayed by the display unit 111, according to a detection result obtained by the motion detecting unit 113.

Changing the display content will be described in [Operation Example 1] to [Operation Example 8] below, The display control unit 114 not only provides to the display unit 111 the display content changed according to the pinching motion performed by the user, but also changes the display object information held in the display data holding unit 115.

The display data holding unit 115 holds display object information to be displayed in the display space 116.

[Pinch Detecting Operation]

The motion detecting unit 113 performs two pinch detecting methods described below. The motion detecting unit 113 may perform both of the two methods or perform only one of the methods.

A first method will be described referring to FIG. 6A and FIG. 6B.

First, the finger motion modeling unit 131 generates the finger motion models 119 of the hand 118 of the user. In FIG. 6A, only the finger motion models 119 of two fingers are illustrated, but the finger motion models 119 of three or more fingers may be used.

Next, the pinching motion detecting unit 132 obtains the distance between the fingertips of the finger motion models 119 and the sensor unit 112 based on the measurement result obtained by the sensor unit 112 capable of performing range measurement. The pinching motion detecting unit 132 determines which end of each finger motion model 119 corresponds to the fingertip, based on the arrangement relationship of the finger motion models 119 assumed based on a general hand shape.

Figure 6A:
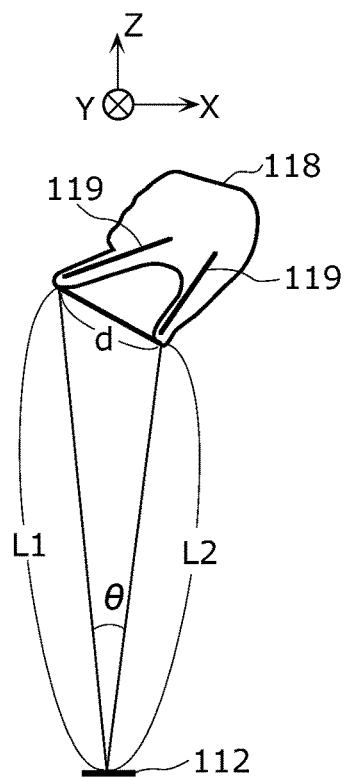
FIG. 6A illustrates a pinch detecting method according to the embodiment.

In FIG. 6A, distance L1 indicates a distance between the sensor unit 112 and one of the fingertips of the two fingers performing pinching motion, and distance L2 indicates a distance between the sensor unit 112 and the other of the fingertips.

The pinching motion detecting unit 132 obtains angle θ formed between a line connecting the sensor unit 112 and one of the fingertips and a line connecting the sensor unit 112 and the other of the fingertips, based on the image information obtained by the sensor unit 112.

Figure 7A:
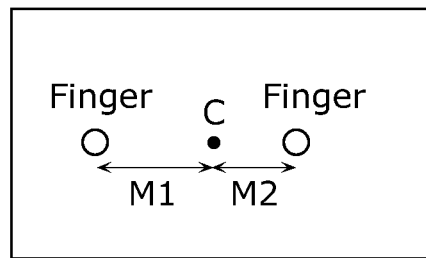
FIG. 7A illustrates processing of calculating an angle formed between two straight lines connecting fingertips and a sensor unit according to the embodiment.
Figure 7B:
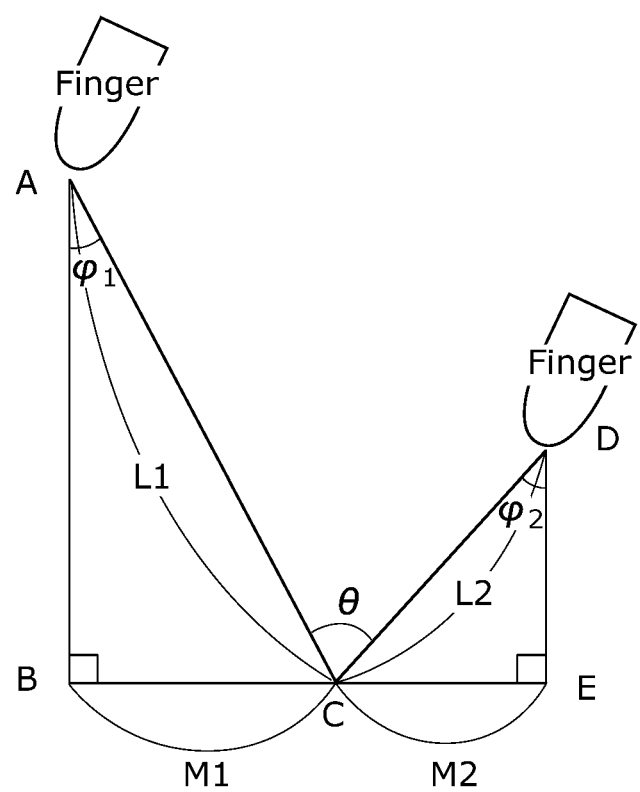
FIG. 7B illustrates the processing of calculating an angle formed between two straight lines connecting fingertips and a sensor unit according to the embodiment.

For example, the pinching motion detecting unit 132 obtains angle θ by the following method. FIG. 7A and FIG. 7B are diagrams for illustrating a method of calculating angle θ.

FIG. 7A illustrates one example of 2D image information obtained by the sensor unit 112. As FIG. 7A illustrates, the pinching motion detecting unit 132 obtains distance M1 and distance M2 which are distances between center C of the sensor unit 112 and two fingertips. Here, the coordinates of center C of the sensor unit 112 are, for example, central coordinates of an image.

Next, as FIG. 7B illustrates, straight lines AB and DE are drawn from the fingertips to the sensor unit 112. Accordingly, two right triangles ABC and CDE are formed. Here, when $\phi_1$ is the internal angle of angle BAC, and $\phi_2$ is the internal angle of angle CDE, a relation of angle $\theta=\phi_1+\phi_2$ is satisfied. Accordingly, angle θ is obtained by (Expression 1) and (Expression 2) below.

[Math 1]

$$\sin\phi_1 = \frac{M1}{L1} \quad \sin\phi_2 = \frac{M2}{L2} \qquad \text{(Expression 1)}$$

$$\cos\phi_1 = \frac{\sqrt{L1^2 - M1^2}}{L1} \quad \cos\phi_2 = \frac{\sqrt{L2^2 - M2^2}}{L2}$$

[Math 2]

$$\begin{aligned}\cos\theta &= \cos(\phi_1 + \phi_2) \\ &= \cos\phi_1\cos\phi_2 - \sin\phi_1\sin\phi_2 \\ &= \frac{\sqrt{(L1^2 - M1^2)(L2^2 - M2^2)} - M1M2}{L1L2}\end{aligned} \qquad \text{(Expression 2)}$$

With distance L1, distance L2, and angle θ, distance d between the fingertips of the two fingers is obtained by the following (Expression 3).

[Math 3]

$$d = \sqrt{L1^2 + L2^2 - 2L1L2\cos\theta} \qquad \text{(Expression 3)}$$

Figure 6B:
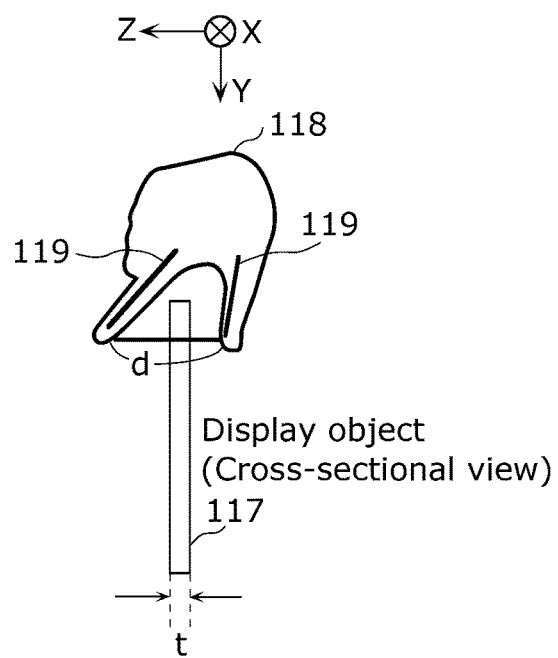
FIG. 6B illustrates the pinch detecting method according to the embodiment.

Next, when the display object 117 to be pinched is present between the fingertips of the two fingers as illustrated in FIG. 6B, the pinching motion detecting unit 132 compares distance d between the fingertips of the two fingers with thickness t of the display object 117. When a relation of (thickness t of the display object) ≥ (distance d between the fingertips of the two fingers) is satisfied, the pinching motion detecting unit 132 detects pinching motion.

In this way, the motion detecting unit 113 detects the 3D positions of the fingertips of the user based on the finger motion models 119. When a portion of the display object is present between the fingertips and the distance between the fingertips is less than or equal to the thickness of the display object, the motion detecting unit 113 determines that the pinching motion has been performed.

Next, a description is given of a second pinch detecting method.

The pinching motion detecting unit 132 performs pattern matching between the pinching motion models 136 held in the pinching motion model holding unit 133 by the user in advance and the finger motion models 119, and detects pinch when a match is found.

As described, the motion detecting unit 113 determines that the pinching motion has been performed, when the shape of the finger motion models 119 matches the shape of one of the predetermined pinching motion models 136. Here, "match" is not limited to a complete match, but also include a case where similarity is greater than a predetermined threshold.

[Display Control when Pinch is Detected]

Figure 8A:
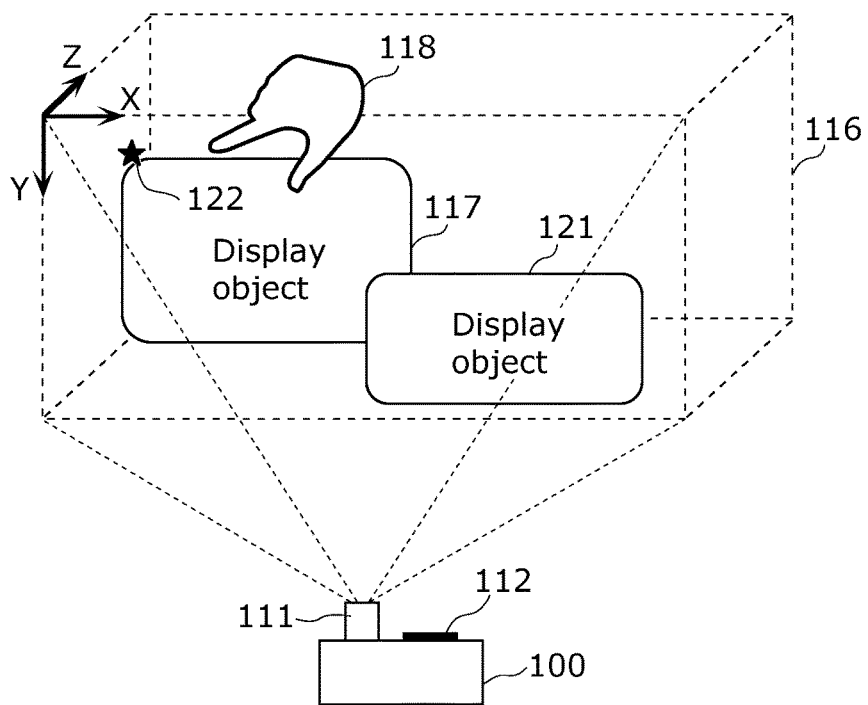
FIG. 8A schematically illustrates pinch detection and display control according to the embodiment.
Figure 8B:
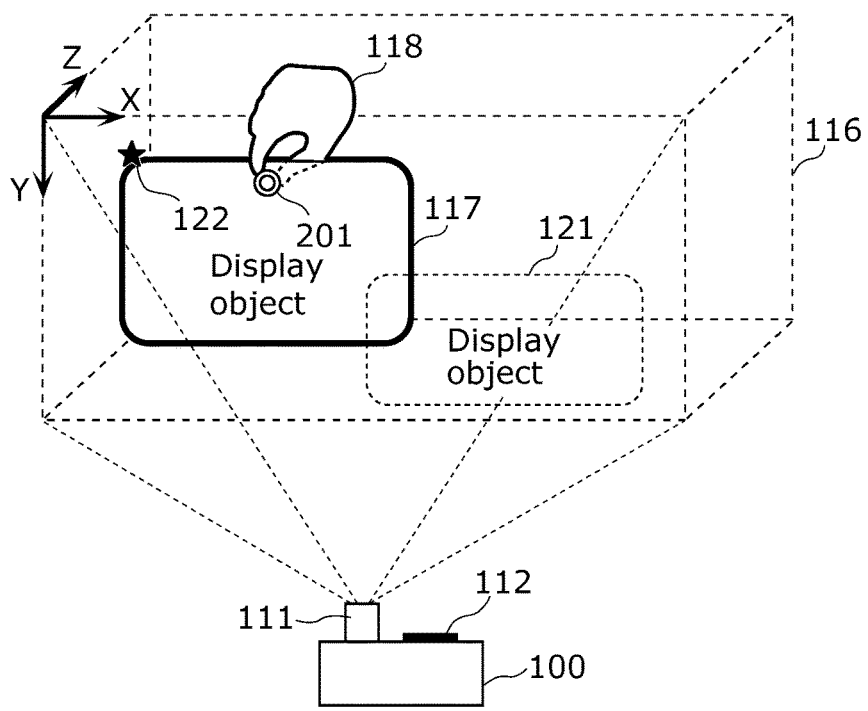
FIG. 8B schematically illustrates the pinch detection and the display control according to the embodiment.

Hereinafter, referring to FIG. 8A and FIG. 8B, outlines of the pinch detection and the display control according to the present embodiment will be described. In FIG. 8A and FIG. 8B, two display objects, which are a display object 117 and a display object 121, are displayed in the display space 116, but the number of display objects may be three or more. Here, a description is given of the case where the display object 117 is pinched.

Position coordinates 122 are the position coordinates of the display object 117.

FIG. 8A illustrates a state before the display object 117 is pinched by the hand 118 of the user, that is, the display object 117 has not yet been pinched. FIG. 8B illustrates a state where the display object 117 is being pinched by the hand 118 of the user.

As FIG. 8B illustrates, the pinching motion detecting unit 132 detects the pinching motion, and obtains pinch position coordinates 201 (Tx, Ty, Tz).

The pinching motion detecting unit 132 also notifies the display control unit 114 that pinch of the display object 117 has been detected. In response to the pinch detection of the display object 117, the display control unit 114 provides to the display unit 111 a display instruction for performing a visual effect on the display object 117. The visual effect notifies the user that the display object 117 has been pinched. In other words, the display control unit 114 changes the manner of displaying the display object 117 pinched by the pinching motion.

Specifically, the display control unit 114 highlights the pinched display object 117. For example, as FIG. 8B illustrates, the display control unit 114 highlights the outline of the display object 117. The display control unit 114 may also display text information indicating that the display object 117 has been pinched.

The display control unit 114 may also change the manner of displaying the display object (here, the display object 121) other than the pinched display object 117. Specifically, the display control unit 114 makes the display object 121 less noticeable. For example, the display control unit 114 provides to the display unit 111 a display instruction for performing a visual effect such as increasing transparency of the display object 121 or temporarily hiding the display object 121.

[Flowchart of Pinch Detection]

Figure 9:
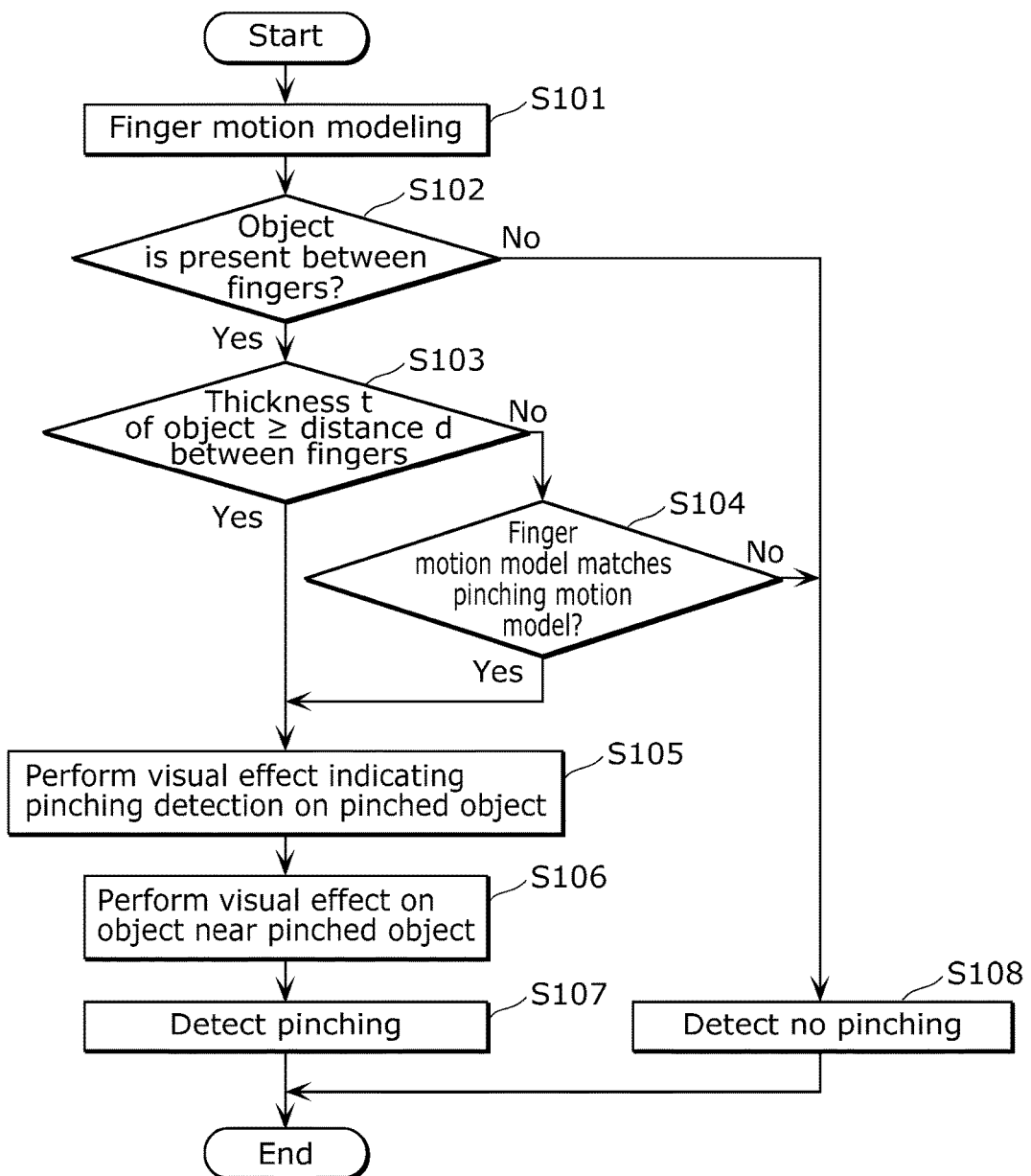
FIG. 9 is a flowchart of pinch detection processing according to the embodiment.

FIG. 9 is a flowchart of pinch detection processing according to the present embodiment.

First, in Step S101, the finger motion modeling unit 131 obtains distance information between each portion of the hand 118 of the user and the sensor unit 112 by using the sensor unit 112. The finger motion modeling unit 131 further determines, based on the width 120 of each portion, portions having a width 120 narrower than a threshold held in the finger width threshold holding unit 134 to be fingers, and generates the finger motion models 119.

Next, in Step S102, the pinching motion detecting unit 132 determines whether or not a display object is present between the fingertips of given two fingers.

When no display object is present between the fingertips of the two fingers (No in S102), the processing proceeds to "detect no pinching" in Step S108, and the processing ends with no pinching motion detected.

On the other hand, when a display object is present between the fingertips of the two fingers (Yes in S102), the processing proceeds to Step S103.

In Step S103, the pinching motion detecting unit 132 compares distance d between the fingertips of the two fingers and thickness t of the display object. When a relation of (thickness t of the display object)<(distance d between the fingertips of two fingers) is satisfied (No in S103), the processing proceeds to Step S104. When a relation of (thickness t of the display object) (distance d between the fingertips of two fingers) is satisfied (Yes in S103), the processing proceeds to Step S105.

In Step S104, the pinching motion detecting unit 132 performs pattern matching between the finger motion models 119 obtained in Step S101 and the pinching motion models 136 held in the pinching motion model holding unit 133. When no match is found between the finger motion models 119 and the pinching motion models 136 (No in Step S104), the processing proceeds to "detect no pinching" in Step S108, and the processing ends with no pinching motion detected. On the other hand, when a match is found between the finger motion models 119 and the pinching motion models 136 (Yes in S104), the processing proceeds to Step S105.

In Step S105, the display control unit 114 provides to the display unit 111 a display instruction indicating detection of pinching of the display object determined to have been pinched by the relation of (thickness t of the display object) (distance d between the fingertips of two fingers) being satisfied (Yes in S103) or by the pattern matching with the pinching motion models 136 (Yes in S104). Accordingly, the display unit 111 displays an image in the display space 116 according to the display instruction. Details for the display instruction indicating pinch detection will be described later in [Operation Example 1] to [Operation Example 8].

Next, in Step S106, the display control unit 114 provides to the display unit 111 a display instruction for increasing transparency of the display objects other than the pinched display object or temporarily hiding the display objects other than the pinched display object. The processing proceeds to Step S107 of pinch detection.

Although both the determination using thickness t of the display object and distance d between the fingertips (S103) and the pattern matching between the finger motion models 119 and the pinching motion models 136 (S104) are performed in the above description, only one of them may be performed. The order of Steps S103 and S104 may be reverse.

Moreover, the order of Steps S105 to S107 may be any order. Part or all of Steps S105 to S107 may be performed simultaneously (in parallel).

Moreover, the above processing is performed in real time (repeatedly performed at predetermined time intervals), so that the finger motion models 119 are updated as needed and pinching motion is detected.

As described above, the motion detecting unit 113 generates the finger motion models 119 by determining portions of a part of the user which are narrower than a predetermined threshold to be fingers, and detects pinching motion based on the finger motion models 119. Specifically, the motion detecting unit 113 detects the 3D positions of the fingertips of the user based on the finger motion models 119. When a portion of the target object (display object 117) is present between the fingertips and the distance between the fingertips is less than or equal to the thickness of the target object, the motion detecting unit 113 determines that pinching motion has been performed. Alternatively, the motion detecting unit 113 determines that pinching motion has been performed, when the shape of the finger motion models 119 matches one of the shapes of the predetermined pinching motion models 136.

Accordingly, the motion detecting unit 113 is capable of appropriately detecting pinching motion based on the finger motion models 119.

Hereinafter, a description will be given of a display object operating method performed by the user after the pinch detection.

Operation Example 1

Figure 10A:
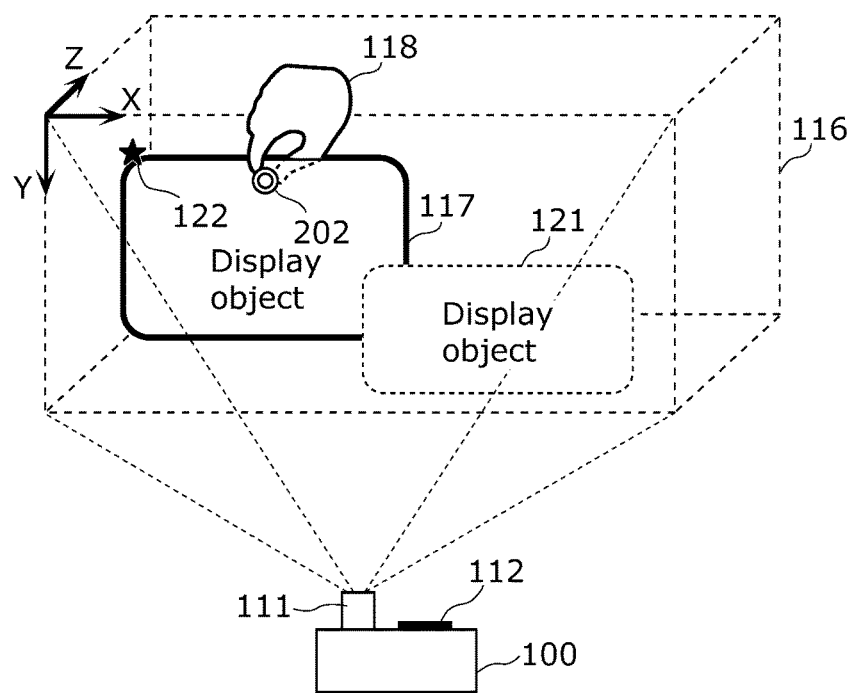
FIG. 10A illustrates Operation Example 1 according to the embodiment.
Figure 10B:
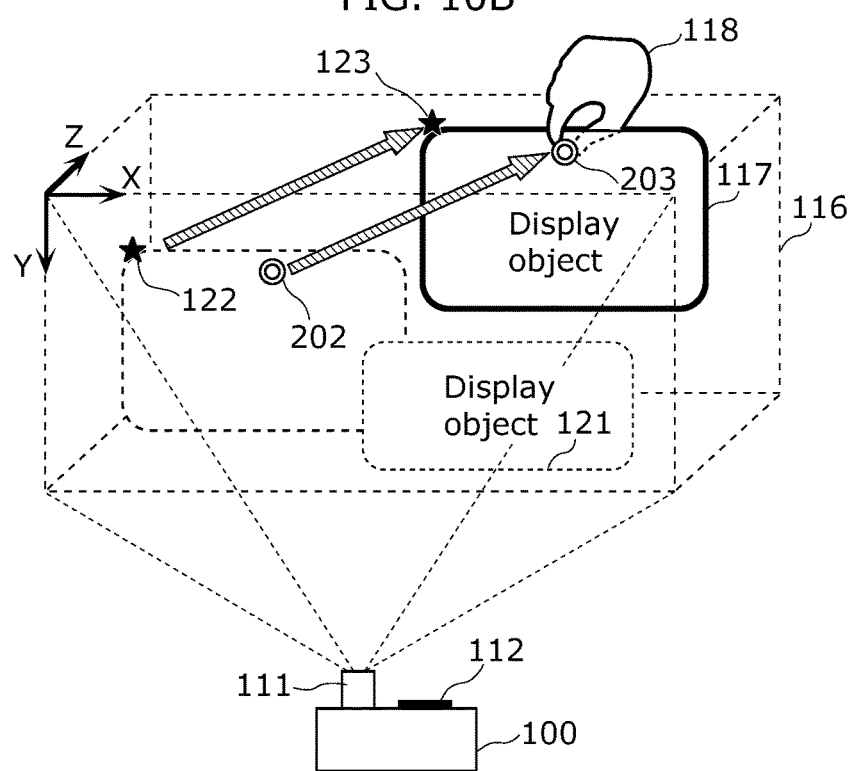
FIG. 10B illustrates Operation Example 1 according to the embodiment.

Operation Example 1 is moving motion in which a user moves the display object 117 through pinching motion. FIG. 10A and FIG. 10B are diagrams for illustrating Operation Example 1.

FIG. 10A illustrates a state where the user is pinching the display object 117 located at position coordinates 122 (O1$x$, O1$y$, O1$z$). Here, the coordinates of the pinch position are pinch position coordinates 202 (T1$x$, T1$y$, T1$z$).

FIG. 10B illustrates a case where the user moves the pinch position to pinch position coordinates 203 (T2$x$, T2$y$, T2$z$) while pinching the display object 117.

In response to the movement of the display object 117 by the user, that is, the movement of the pinch position from the pinch position coordinates 202 (T1$x$, T1$y$, T1$z$) to the pinch position coordinates 203 (T2$x$, T2$y$, T2$z$), the display control unit 114 moves the display position of the display object 117 from the position coordinates 122 (O1$x$, O1$y$, O1$z$) to position coordinates 123 (O2$x$, O2$y$, O2$z$).

Specifically, the following relations are satisfied: O2$x$=O1$x$+(T2$x$−T1$x$), O2$y$=O1$y$+(T2$y$−T1$y$), and O2$z$=O1$z$+(T2$z$−T1$z$).

As described, when the motion detecting unit 113 detects the moving motion in which the user pinches and moves the target object (display object 117), the display control unit 114 moves the 3D position of the target object in accordance with the moving motion. Specifically, after the motion detecting unit 113 detects pinching motion in which the user pinches the target object and when the pinch position is moved with the pinching motion maintained, the display control unit 114 moves the 3D position of the target object in accordance with the movement of the pinch position. Here, the term "in accordance with" refers to, for example, moving a target object in the same direction and by the same movement amount as the movement of the pinch position. The movement direction and the movement amount of the target object need not be exactly the same as the movement direction and the movement amount of the pinch position, and a predetermined offset or correction may be added.

Operation Example 2

Figure 11A:
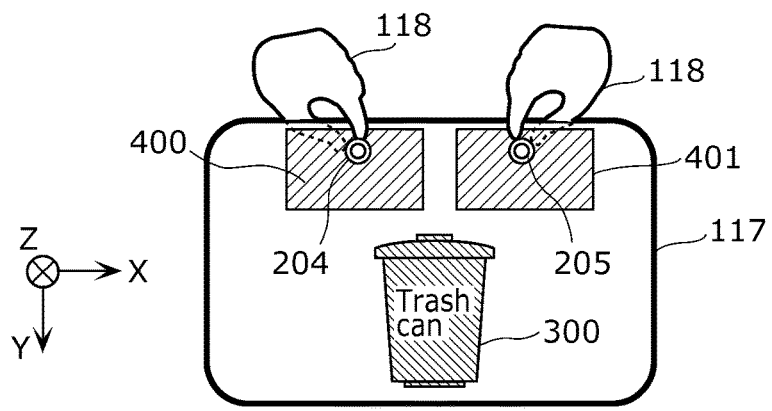
FIG. 11A illustrates Operation example 2 according to the embodiment.
Figure 11B:
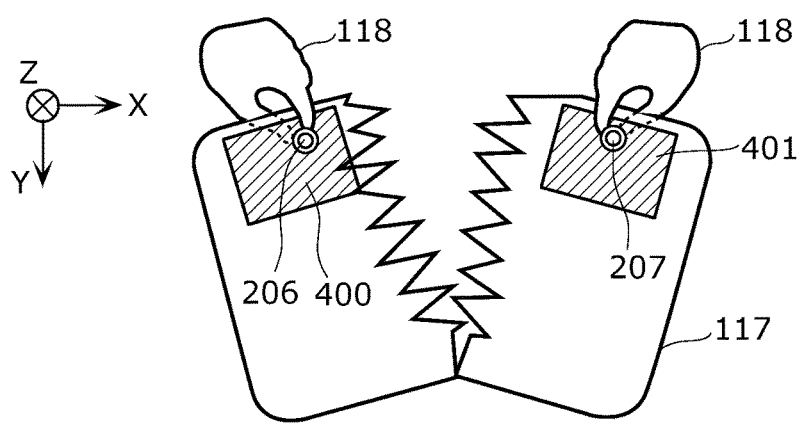
FIG. 11B illustrates Operation example 2 according to the embodiment.
Figure 11C:
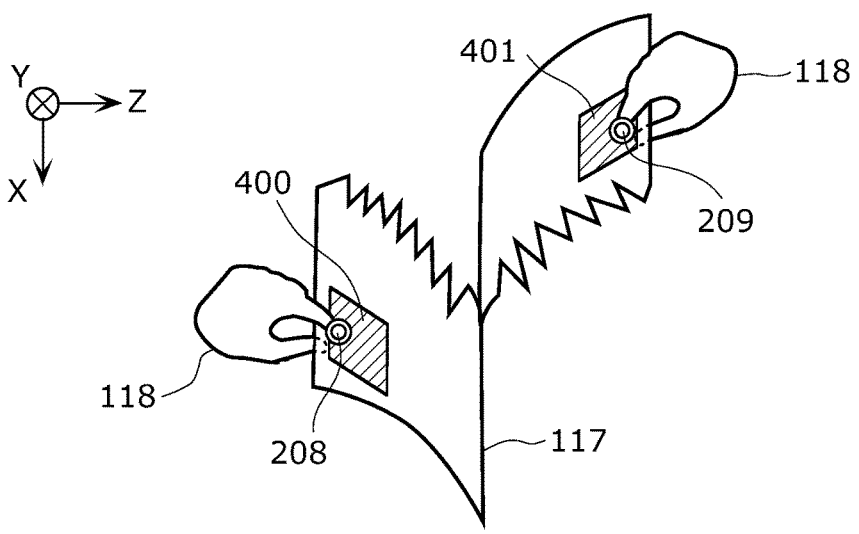
FIG. 11C illustrates Operation Example 2 according to the embodiment.

Operation Example 2 is deleting motion in which a user deletes the display object 117 through pinching motion. FIG. 11A to FIG. 11C are diagrams for illustrating Operation Example 2.

A to-be-deleted region 400 and a to-be-deleted region 401 illustrated in FIG. 11A to FIG. 11C are predetermined regions included in the display object 117. As FIG. 11A illustrates, when pinching motion by the user on the to-be-deleted region 400 and the to-be-deleted region 401 is detected, the display object 117 enters a deletion wait state.

Here, the display control unit 114 causes the display unit 111 to display a notification image 300 for notifying the user that the display object 117 is in the deletion wait state. Although an image of a trash box is used as the notification image 300 here, the notification image 300 may have any designs.

Next, as FIG. 11B illustrates, when two pinch positions are changed in such a manner that pinch position coordinates 204 are changed to pinch position coordinates 206 (T3$x$, T3$y$, T3$z$) and pinch position coordinates 205 are changed to pinch position coordinates 207 (T4$x$, T4$y$, T4$z$), the display control unit 114 causes the display unit 111 to display a display effect such as an effect in which the display object 117 is torn apart, in accordance with the motion of the user.

Here, the distance between the pinch position coordinates 206 and the pinch position coordinates 207 is represented by (Expression 4) below.

[Math 4]

$$\sqrt{(T4x-T3x)^2+(T4y-T3y)^2+(T4z-T3z)^2} \quad \text{(Expression 4)}$$

When the distance is greater than a predetermined deletion threshold, the display control unit 114 determines that the display object 117 has been deleted, and provides to the display unit 111 an instruction for deleting the display of the display object 117. Moreover, the display control unit 114 also deletes information on the display object 117 held in the display data holding unit 115.

Next, in a similar manner to FIG. 11B, as FIG. 11C illustrates, when two pinch positions are changed in such a manner that the pinch position coordinates 204 are changed to pinch position coordinates 208 (T5$x$, T5$y$, T5$z$) and the pinch position coordinates 205 are changed to pinch position coordinates 209 (T6$x$, T6$y$, T6$z$), the display control unit 114 causes the display unit 111 to display a display effect such as an effect in which the display object 117 is torn apart, in accordance with the motion of the user.

Here, the distance between the pinch position coordinates 206 and the pinch position coordinates 207 is represented by (Expression 5) below.

[Math 5]

$$\sqrt{(T6x-T5x)^2+(T6y-T5y)^2+(T6z-T5z)^2} \quad \text{(Expression 5)}$$

When the distance is greater than a predetermined deletion threshold, the display control unit 114 determines that the display object 117 has been deleted, and provides to the display unit 111 an instruction for deleting the display of the display object 117. Moreover, the display control unit 114 also deletes information on the display object 117 held in the display data holding unit 115.

In such a manner, when the motion detecting unit 113 detects tearing or ripping motion in which the user tears or rips the target object (display object 117), the display control unit 114 deletes the target object. For example, after the motion detecting unit 113 detects pinching motion in which the user pinches two pints of the target object with both hands and when the pinch positions are moved in such a manner that the distance between the two points is greater than or equal to a predetermined deletion threshold, the display control unit 114 deletes the target object.

Although it has been described above that the to-be-deleted region 400 and the to-be-deleted region 401 enter a deletion wait state when they are pinched, the deletion wait state may occur when given two points of the display object 117 are pinched.

Operation Example 3

Figure 12A:
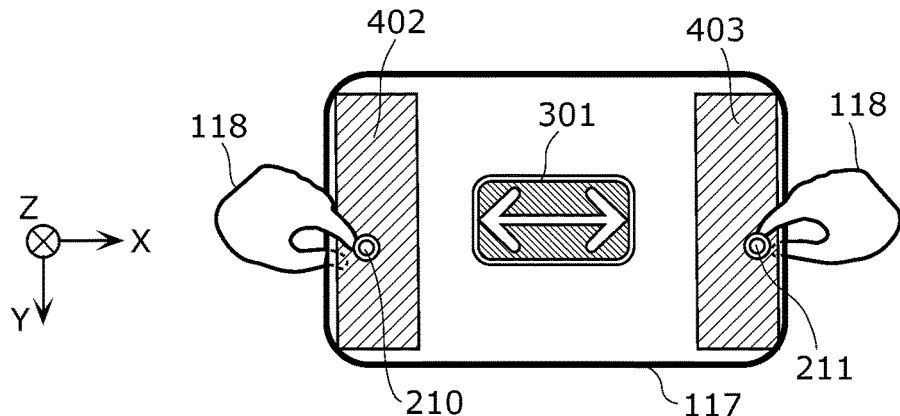
FIG. 12A illustrates Operation Example 3 according to the embodiment.
Figure 12B:
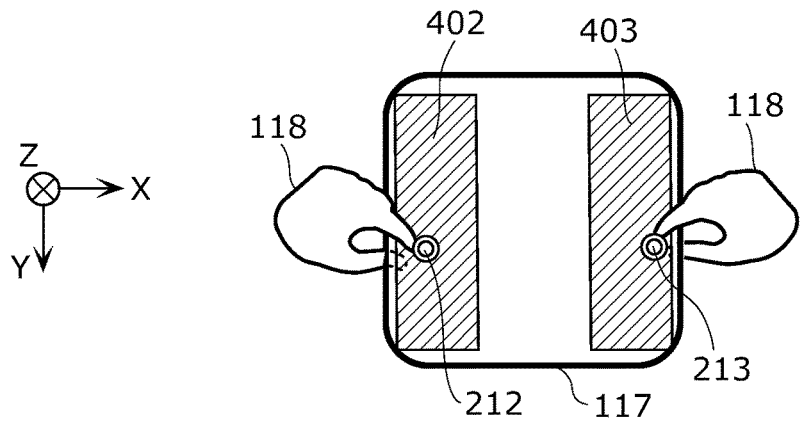
FIG. 12B illustrates Operation Example 3 according to the embodiment.
Figure 12C:
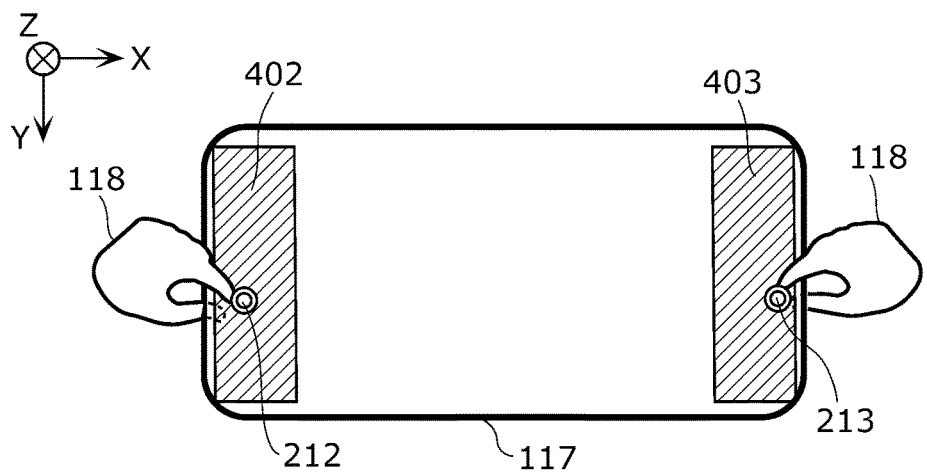
FIG. 12C illustrates Operation Example 3 according to the embodiment.

Operation Example 3 is enlarging or reducing motion in which the user horizontally enlarges or reduces the display object 117 through pinching motion. FIG. 12A to FIG. 12C are diagrams for illustrating Operation Example 3.

A to-be-horizontally enlarged/reduced region 402 and a to-be-horizontally enlarged/reduced region 403 are predetermined regions included in the display object 117. For example, the to-be-horizontally enlarged/reduced region 402 is a region near the left end of the display object 117, and the to-be-horizontally enlarged/reduced region 403 is a region near the right end of the display object 117.

As FIG. 12A illustrates, when pinching motion in which the user pinches the to-be-horizontally enlarged/reduced region 402 and the to-be-horizontally enlarged/reduced region 403 is detected, the display object 117 enters a horizontal enlargement/reduction wait state.

Here, the display control unit 114 causes the display unit 111 to display a notification image 301 for notifying the user that the display object 117 is in the horizontal enlargement/reduction wait state. Here, an image of a horizontal arrow is used as the notification image 301, but the notification image 301 may have any designs.

Next, as FIG. 12B and FIG. 12C illustrate, when two pinch positions are changed in such a manner that pinch position coordinates 210 (T7$x$, T7$y$, T7$z$) are changed to pinch position coordinates 212 (T9$x$, T9$y$, T9$z$) and pinch position coordinates 211 (T8$x$, T8$y$, T8$z$) are changed to pinch position coordinates 213 (T10$x$, T10$y$, T10$z$), the display control unit 114 provides to the display unit 111 a display instruction for horizontally enlarging or reducing the size of the display object 117, in accordance with the horizontal change amounts (T9$x$−T7$x$) and (T10$x$−T8$x$).

In such a manner, when the motion detecting unit 113 detects enlarging motion in which the user enlarges the target object (display object 117) while pinching two pints of the target object, the display control unit 114 enlarges the target object. Specifically, after the motion detecting unit 113 detects pinching motion in which the user pinches the to-be-horizontally enlarged/reduced region 402 and the to-be-horizontally enlarged/reduced region 403 included in the target object with both hands, and when the pinch positions are moved in such a manner that the horizontal difference between the pinch position coordinates increases with the pinching motion maintained, the display control unit 114 enlarges the horizontal size of the target object by the same amount as the difference. The enlargement amount of the horizontal size need not be exactly the same as the increase amount of the horizontal difference of the pinch positions, and a predetermined offset or correction may be added.

When the motion detecting unit 113 detects reducing motion in which the user reduces the target object while pinching two points of the target object, the display control unit 114 reduces the target object. Specifically, after the motion detecting unit 113 detects pinching motion in which the user pinches the to-be-horizontally enlarged/reduced region 402 and the to-be-horizontally enlarged/reduced region 403 included in the target object with both hands, and when the pinch positions are moved in such a manner that the horizontal difference between the pinch position coordinates decreases with the pinching motion maintained, the display control unit 114 reduces the horizontal size of the target object by the same amount as the difference. The reduction amount of the horizontal size need not be exactly the same as the decrease amount of the horizontal difference of the pinch positions, and a predetermined offset or correction may be added.

Operation Example 4

Figure 13A:
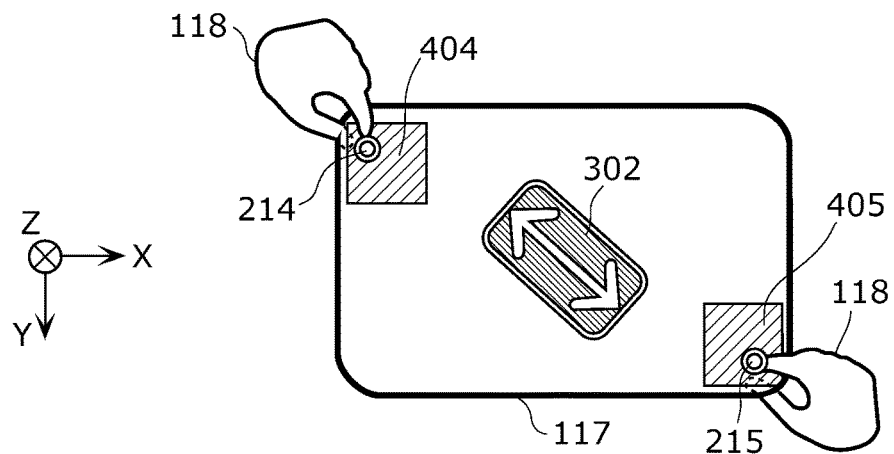
FIG. 13A illustrates Operation Example 4 according to the embodiment.
Figure 13B:
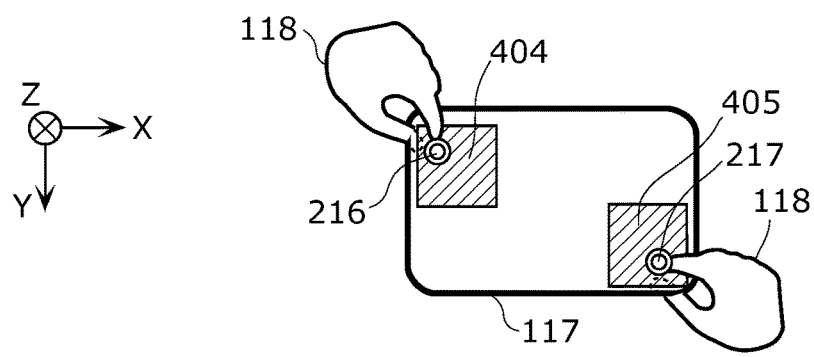
FIG. 13B illustrates Operation Example 4 according to the embodiment.
Figure 13C:
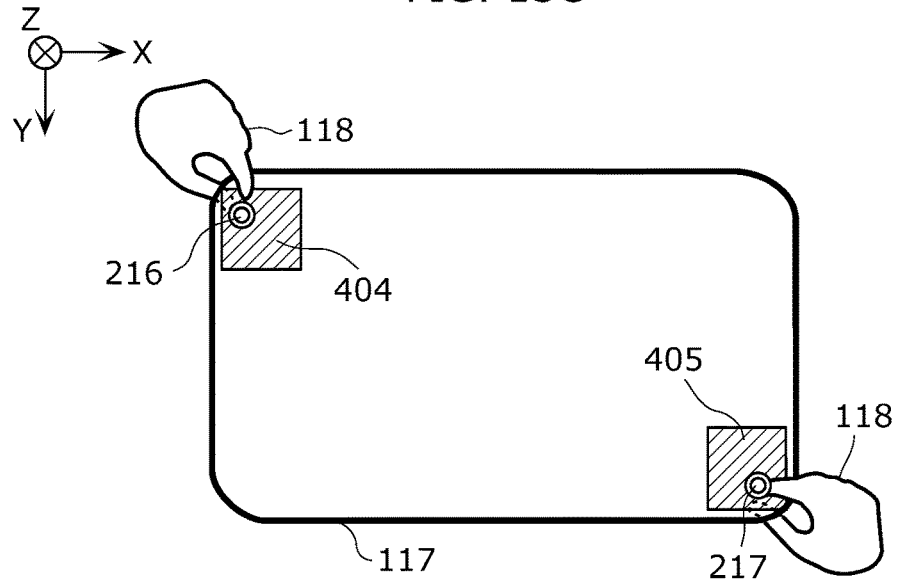
FIG. 13C illustrates Operation Example 4 according to the embodiment.

Operation Example 4 is enlarging or reducing motion in which the user diagonally enlarges or reduces the display object 117 through pinching motion. FIG. 13A to FIG. 13C are diagrams for illustrating Operation Example 4.

A to-be-diagonally enlarged/reduced region 404 and a to-be-diagonally enlarged/reduced region 405 are predetermined regions included in the display object 117. For example, the to-be-diagonally enlarged/reduced region 404 is a region near the top-left end of the display object 117, and the to-be-diagonally enlarged/reduced region 405 is a region near the right-bottom end of the display object 117.

As FIG. 13A illustrates, when pinching motion in which the user pinches the to-be-diagonally enlarged/reduced region 404 and the to-be-diagonally enlarged/reduced region 405 are detected, the display object 117 enters a diagonal enlargement/reduction wait state. The two to-be-diagonally enlarged/reduced regions may be regions near the bottom-left end and the top-right end of the display object 117. When pinching motion is detected on either one of: a set of the region near the top-left end and the region near the bottom-right end; or a set of the region near the bottom-left end and the region near the top-right end, the display object 117 may enter a diagonal enlargement/reduction wait state. In other words, when regions near two opposite corner portions of the display object 117 are pinched, the display object 117 may enter a diagonal enlargement/reduction wait state.

Here, the display control unit 114 causes the display unit 111 to display a notification image 302 for notifying the user that the display object 117 is in a diagonal enlargement/reduction wait state. Here, an image of a diagonal arrow is used as the notification image 302, but the notification image 302 may have any designs.

Next, as FIG. 13B and FIG. 13C illustrate, when two pinch positions are changed from pinch position coordinates 214 (T11$x$, T11$y$, T11$z$) to pinch position coordinates 216 (T13$x$, T13$y$, T13$z$) and from pinch position coordinates 215 (T12$x$, T12$y$, T12$z$) to pinch position coordinates 217 (T14$x$, T14$y$, T14$z$), the diagonal change amount is represented by (Expression 6) and (Expression 7) below.

[Math 6]

$$\sqrt{(T13x-T11x)^2+(T13y-T11y)^2} \qquad \text{(Expression 6)}$$

[Match 7]

$$\sqrt{(T14x-T12x)^2+(T14y-T12y)^2} \qquad \text{(Expression 7)}$$

The display control unit 114 provides to the display unit 111 a display instruction for enlarging or reducing the diagonal size of the display object 117 in accordance with the change amount.

In such a manner, when the motion detecting unit 113 detects enlarging motion in which the user enlarges the target object (display object 117) while pinching two pints of the target object, the display control unit 114 enlarges the target object. Specifically, after the motion detecting unit 113 detects pinching motion in which the user pinches the to-be-diagonally enlarged/reduced region 404 and the to-be-diagonally enlarged/reduced region 405 included in the target object with both hands, and when the pinch positions are moved in such a manner that the diagonal difference between the pinch position coordinates increases with the pinching motion maintained, the display control unit 114 enlarges the diagonal size of the target object by the same amount as the difference. The enlargement amount of the diagonal size need not be exactly the same as the increase amount of the diagonal difference of the pinch positions, and a predetermined offset or correction may be added.

When the motion detecting unit 113 detects reducing motion in which the user reduces the target object while pinching two points of the target object, the display control unit 114 reduces the target object. Specifically, after the motion detecting unit 113 detects pinching motion in which the user pinches the to-be-diagonally enlarged/reduced region 404 and the to-be-diagonally enlarged/reduced region 405 included in the target object with both hands, and when the pinch positions are moved in such a manner that the diagonal difference between the pinch position coordinates decreases with the pinching motion maintained, the display control unit 114 reduces the diagonal size of the target object by the same amount as the difference. The reduction amount of the diagonal size need not be exactly the same as the decrease amount of the diagonal difference of the pinch positions, and a predetermined offset or correction may be added.

Operation Example 5

Figure 14A:
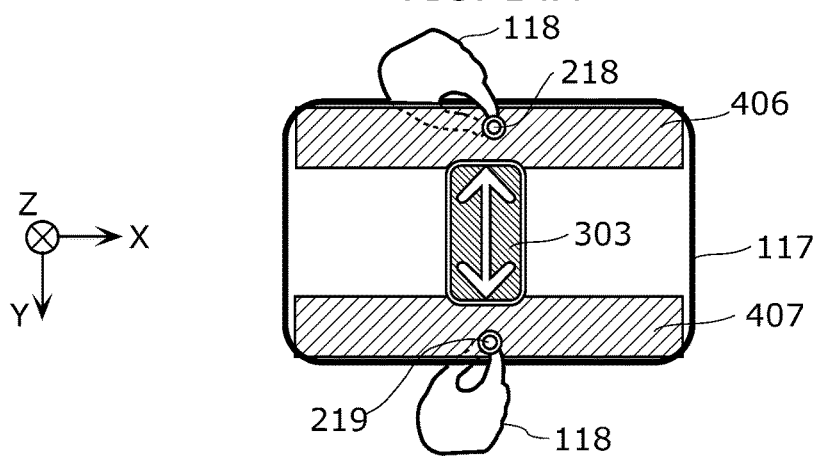
FIG. 14A illustrates Operation Example 5 according to the embodiment.
Figure 14B:
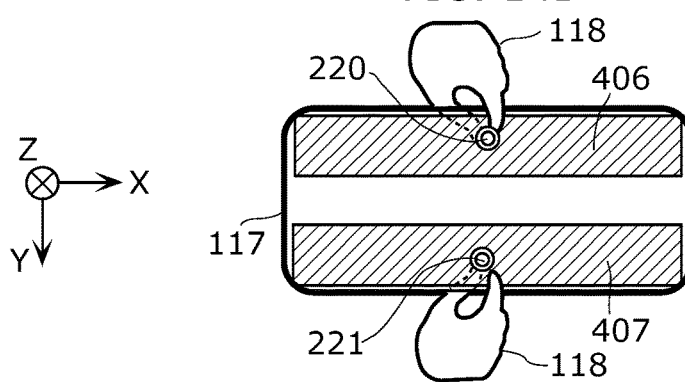
FIG. 14B illustrates Operation Example 5 according to the embodiment.
Figure 14C:
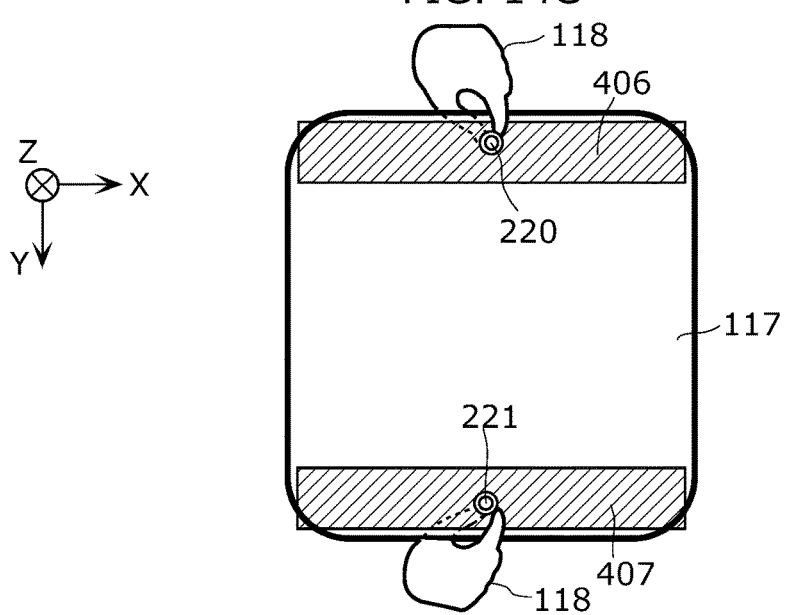
FIG. 14C illustrates Operation Example 5 according to the embodiment.

Operation Example 5 is enlarging or reducing motion in which the user vertically enlarges or reduces the display object 117 through pinching motion. FIG. 14A to FIG. 14C are diagrams for illustrating Operation Example 5.

A to-be-vertically enlarged/reduced region 406 and a to-be-vertically enlarged/reduced region 407 are predetermined regions included in the display object 117. For example, the to-be-vertically enlarged/reduced region 406 is a region near the top end of the display object 117, and the to-be-vertically enlarged/reduced region 407 is a region near the bottom end of the display object 117. As FIG. 14A illustrates, when pinching motion is detected in which the user pinches the to-be-vertically enlarged/reduced region 406 and the to-be-vertically enlarged/reduced region 407, the display object 117 enters a vertical enlargement/reduction wait state.

Here, the display control unit 14 causes the display unit 111 to display a notification image 303 for notifying the user that the display object 117 is in a vertical enlargement/reduction wait state. Here, an image of a vertical arrow is used as the notification image 303, but the notification image 303 may have any designs.

Next, as FIG. 14B and FIG. 14C illustrate, when two pinch positions are changed from pinch position coordinates 218 (T15$x$, T15$y$, T15$z$) to pinch position coordinates 220 (T17$x$, T17$y$, T17$z$) and from pinch position coordinates 219 (T16$x$, T16$y$, T16$z$) to pinch position coordinates 221 (T18$x$, T18$y$, T18$z$), the display control unit 114 provides to the display unit 111 a display instruction for enlarging or reducing the vertical size of the display object 117 in accordance with the vertical change amounts (T17$y$−T15$y$) and (T18$y$−T16$y$).

In such a manner, when the motion detecting unit 113 detects enlarging motion in which the user enlarges the target object (display object 117) while pinching two pints of the target object, the display control unit 114 enlarges the target object. Specifically, after the motion detecting unit 113 detects pinching motion in which the user pinches the to-be-vertically enlarged/reduced region 406 and the to-be-vertically enlarged/reduced region 407 included in the target object with both hands, and when the pinch positions are moved in such a manner that the vertical difference between the pinch position coordinates increases with the pinching motion maintained, the display control unit 114 enlarges the vertical size of the target object by the same amount as the difference. The enlargement amount of the vertical size need not be exactly the same as the increase amount of the vertical difference of the pinch positions, and a predetermined offset or correction may be added.

When the motion detecting unit 113 detects reducing motion in which the user reduces the target object while pinching two points of the target object, the display control unit 114 reduces the target object. Specifically, after the motion detecting unit 113 detects pinching motion in which the user pinches the to-be-vertically enlarged/reduced region 406 and the to-be-vertically enlarged/reduced region 407 included in the target object with both hands, and when the pinch positions are moved in such a manner that the vertical difference between the pinch position coordinates decreases with the pinching motion maintained, the display control unit 114 reduces the vertical size of the target object by the same amount as the difference. The reduction amount of the vertical size need not be exactly the same as the decrease amount of the vertical difference of the pinch positions, and a predetermined offset or correction may be added.

Operation Example 6

Figure 15A:
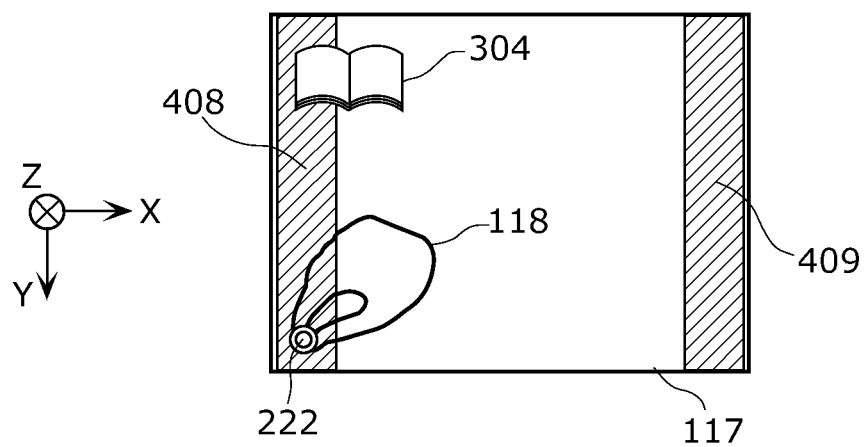
FIG. 15A illustrates Operation Example 6 according to the embodiment.
Figure 15B:
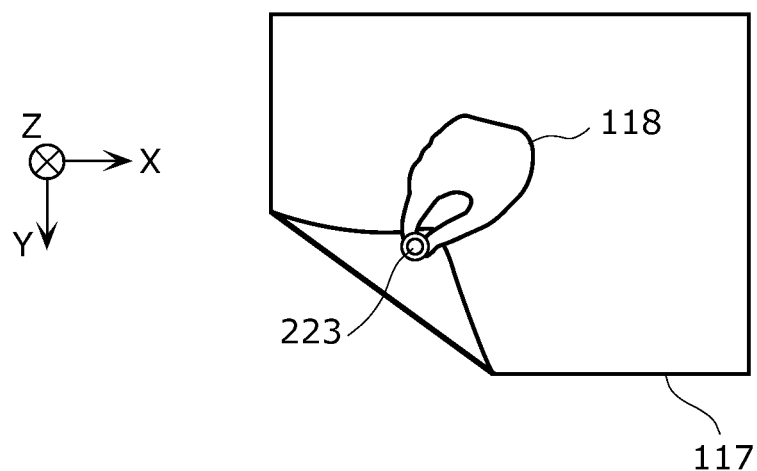
FIG. 15B illustrates Operation Example 6 according to the embodiment.
Figure 15C:
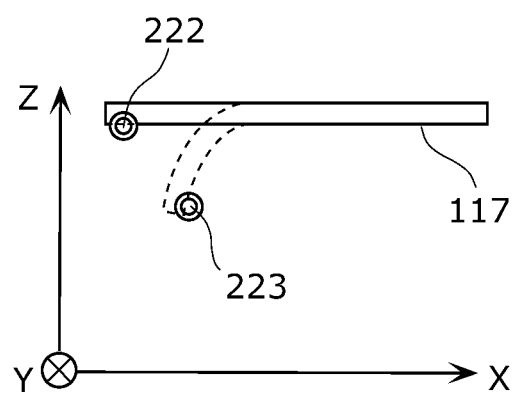
FIG. 15C illustrates Operation Example 6 according to the embodiment.

Operation Example 6 is page-turning motion in which the user turns a page through pinching motion. FIG. 15A to FIG. 15C are diagrams for illustrating Operation Example 6.

A to-be-page-turned region 408 and a to-be-page-turned region 409 are predetermined regions in the display object 117. For example, the to-be-page-turned region 408 is a region near the left end of the display object 117, and the to-be-page-turned region 409 is a region near the right end of the display object 117.

As FIG. 15A illustrates, when pinching motion in which the user pinches the to-be-page-turned region 408 or the to-be-page-turned region 409, the display object 117 enters a page-turn wait state.

Here, the display control unit 114 causes the display unit 111 to display a notification image 304 for notifying the user that the display object 117 is in a page-turn wait state. Here, an image of a book is used as the notification image 304, but the notification image 304 may have any designs.

Next, as FIG. 15B and FIG. 15C illustrate, when the pinch position is changed from pinch position coordinates 222 (T19$x$, T19$y$, T19$z$) to pinch position coordinates 223 (T20$x$, T20$y$, T20$z$) and when relations of (T20$x$−T19$x$≥0), (T20$y$−T19$y$≤0), and (T20$z$−T19$z$≤0) are satisfied, the display control unit 114 determines that page-turning motion has been performed by the user, and provides to the display unit 111 a display instruction of the page-turning motion of the display object 117.

In a similar manner, in the case where the to-be-page-turned region 409 is pinched and when relations of (T20$x$−T19$x$≤0), (T20$y$−T19$y$≤0), and (T20$z$−T19$z$≤0) are satisfied, the display control unit 114 determines that the page-turning motion has been performed by the user, and provides to the display unit 111 a display instruction of the page-turning motion of the display object 117.

In this way, when the motion detecting unit 113 detects the page-turning motion in which the user turns a page of the target object (display object 117) while pinching the target object, the display control unit 114 performs the page-turning motion of the target object. Specifically, the target object is an object having pages that can be turned, and is, for example, a 3D or 2D electronic book. After the motion detecting unit 113 detects pinching motion in which the user pinches the region near the edge of the page of the target object and when the pinch position is moved toward the front and the center of the page with the pinching motion maintained, the display control unit 114 performs the page-turning motion of the target object. Here, the page-turning motion refers to motion in which, for example, a currently displayed page of the electronic book is turned to a next page.

Operation Example 7

Figure 16A:
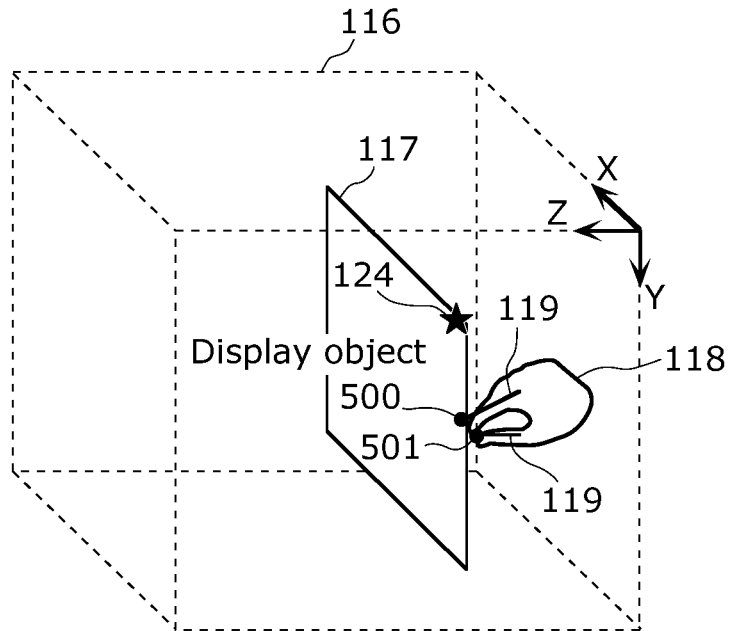
FIG. 16A illustrates Operation Example 7 according to the embodiment.
Figure 16B:
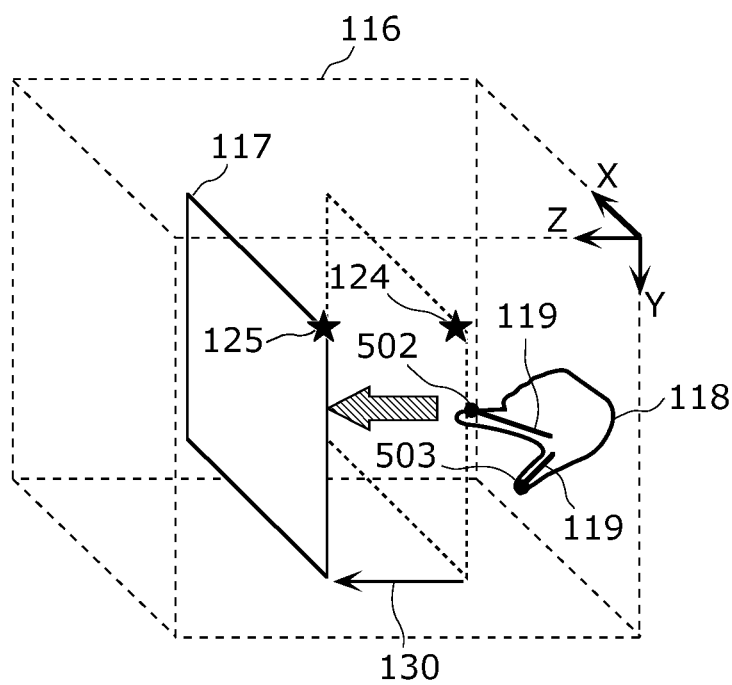
FIG. 16B illustrates Operation Example 7 according to the embodiment.

Operation Example 7 is flicking motion in which the user flicks the display object 117 with fingers. FIG. 16A and FIG. 16B are diagrams for illustrating Operation Example 7.

From the state illustrated in FIG. 16A where the fingers performing a pinching-like state, the user moves the fingers apart as illustrated in FIG. 16B and performs flicking motion in which the user flicks the display object 117. Position coordinates 500 (T21x, T21y, T21z) and position coordinates 501 (T22x, T22y, T22z) are the position coordinates of the fingertips of two fingers performing the pinching-like state. The time immediately before the two fingers are moved apart from the pinching-like state illustrated in FIG. 16A is assumed to be t2.

The positions of the fingertips of the two fingers when the flicking motion is performed in FIG. 16B are changed from the position coordinates 500 (T21x, T21y, T21z) to position coordinates 502 (T23x, T23y, T23z) and from the position coordinates 501 (T22x, T22y, T22z) to position coordinates 503 (T24x, T24y, T24z). The time at which the flicking motion is performed is assumed to be t2.

Here, the movement speed v of the fingertip positions of the two fingers is represented by (Expression 8) below.

[Math 8]

$$v = \frac{\sqrt{(T23x-T21x)^2 + (T23y-T21y)^2 + (T23z-T21z)^2}}{t2-t1} + \frac{\sqrt{(T24x-T22x)^2 + (T24y-T22y)^2 + (T24z-T22z)^2}}{t2-t1}$$

(Expression 8)

Here, the display object 117 is moved from the position coordinates 124 (O3x, O3y, O3z) to the position coordinates 125 (O4x, O4y, O4z) by the flicking motion. Here, for example, the display object 117 is moved in the z-axis direction by a movement distance 130 obtained by (O4z=O3z+v×gain set value). For example, the gain set value can be set by the user.

In this way, when the motion detecting unit 113 detects flicking motion in which the user flicks the target object (display object 117) with fingers, the display control unit 114 moves the target object in the direction in which the target object has been flicked. Specifically, the display control unit 114 moves the target object farther from the original position with an increase in flicking speed of the target object and an increase in change amount of the finger positions.

Operation Example 8

Operation Example 8 is another Operation Example.

Figure 17:
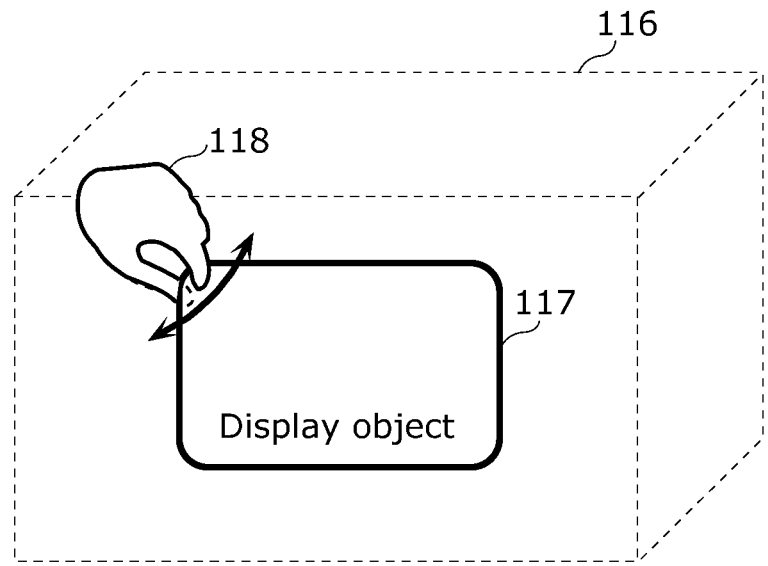
FIG. 17 illustrates Operation Example 8 according to the embodiment.

Here, Operation Example 1 is applied. As FIG. 17 illustrates, when the user shakes the display object 117 while pinching the display control unit 117, the display control unit 114 may perform such a display in that the display object 117 is shaken.

Figure 18:
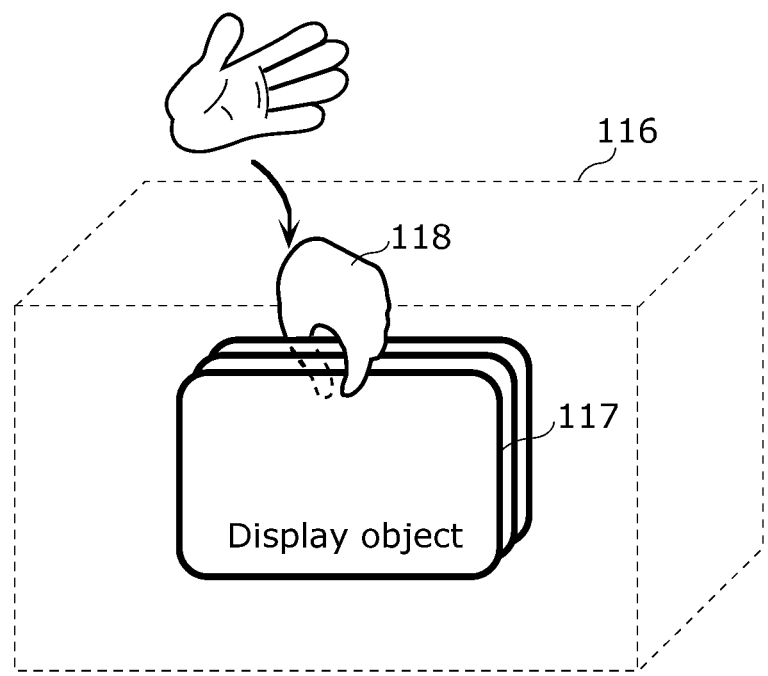
FIG. 18 illustrates Operation Example 8 according to the embodiment.

Moreover, as FIG. 18 illustrates, a plurality of display objects may be pinched by one pinching motion. In such a case, processing is performed on all of the pinched display objects by Operation Examples 1 to 7.

Although the user interface device according to the embodiment of the present invention has been described above, the present invention is not limited to the embodiment.

For example, in the above description, a plate-like object is used as a display object as an example, however, the shape of the display object is not limited to the example.

Moreover, each processing unit included in the user interface device according to the embodiment is typically realized as an LSI (Large Scale Integration) that is an integrated circuit. These LSIs may be integrated into individual chips, or into a single chip so as to include part or all of the LSIs.

Furthermore, circuit integration is not limited to the LSI, but may be realized with a dedicated circuit or a general-purpose processor. FPGA (Field Programmable Gate Array) permitting programming after the manufacture of the LSI or a reconfigurable processor which can reconfigure connection or setting of circuit cells in the LSI may be used.

It is to be noted that in the embodiment, each structural element may be implemented with dedicated hardware or realized by executing a software program suitable for the structural element. Each structural element may be realized by a program executing unit such as a CPU and a processor reading and executing a software program stored in a recording medium such as a hard disk and a semiconductor memory.

Furthermore, the divisions of the functional blocks in the block diagrams are exemplary. It may be that the functional blocks are achieved as one functional block, one functional block is divided into functional blocks, or some of the functions are transferred to another functional block. In addition, the functions of functional blocks having similar functions may be processed by single hardware or software in parallel or in a time division manner.

The present invention can be achieved not only as the user interface device, but also as a display object operating method including characteristics units included in the user interface device as steps, a method of controlling the user interface device, and the like.

Moreover, the orders in which the above steps are performed in the user interface device are exemplary for specifically describing the present invention, and orders other than the orders may be used. In addition, some of the steps may be performed at the same time as (in parallel with) other steps.

Although the user interface device according to one or more aspects has been described above based on the embodiment, the present invention is not limited to these embodiment. Those skilled in the art will readily appreciate that various modifications may be made in the embodiment and that other embodiments may be obtained by combining the structural elements in different embodiments, without departing from the spirit of the present invention. Accordingly, all such modifications and embodiments may be included in the scope of the one or more aspects.

The present invention can be applied to the user interface device. In particular, the present invention is useful as a user interface device in an entertainment system and a digital signage system which use 3D imaging.

REFERENCE SIGNS LIST

100 User interface device
111 Display unit
112 Sensor unit
113 Motion detecting unit
114 Display control unit
115 Display data holding unit
116 Display space
117, 121 Display object
118 Hands of user
119 Finger motion model
120 Width
122, 123, 124, 125, 500, 501, 502, 503 Position coordinates
130 Movement distance
131 Finger motion modeling unit
132 Pinching motion detecting unit
133 Pinching motion model holding unit
134 Finger width threshold holding unit
135 Finger motion model registering unit
136 Pinching motion model
201, 202, 203, 204, 205, 206, 207, 208, 209, 210, 211, 212, 213, 214, 215, 216, 217, 218, 219, 220, 221, 222, 223 Pinch position coordinates
300, 301, 302, 303, 304 Notification image
400, 401 To-be-deleted region
402, 403 To-be-horizontally enlarged/reduced region
404, 405 To-be-diagonally enlarged/reduced region
406, 407 To-be-vertically enlarged/reduced region
408, 409 To-be-page-turned region

The invention claimed is:

1. A user interface device comprising:
a display unit configured to display an object in a display space, the object being either a two-dimensional (2D) object or a three-dimensional (3D) object;
a sensor unit configured to measure 3D coordinates of fingers of a user in the display space;
a motion detecting unit configured to detect motion of the fingers of the user relative to the object, based on the 3D coordinates of the fingers of the user measured by the sensor unit; and
a display control unit configured to change display content displayed by the display unit, according to a detection result obtained by the motion detecting unit,
wherein when the motion detecting unit detects a ripping motion by the user of a target object, the display control unit is configured to delete the target object, the ripping motion being a motion in which two pinch positions detected on the target object separate from each other,
wherein the motion detecting unit is configured to detect a pinching motion in which the user pinches the target object which is the object, based on the 3D coordinates of the fingers of the user measured by the sensor unit, and
the motion detecting unit is configured to generate a finger motion model by determining portions of a part of the user which are narrower than a predetermined threshold to be the fingers, and detect the pinching motion based on the finger motion model.

2. The user interface device according to claim 1, wherein when the motion detecting unit detects the pinching motion, the display control unit is configured to change a display manner of the target object.

3. The user interface device according to claim 2, wherein the display unit is configured to display a plurality of objects including the target object in the display space, and
when the motion detecting unit detects the pinching motion, the display control unit is further configured to change a display manner of the plurality of the objects excluding the target object.

4. The user interface device according to claim 1, wherein when the motion detecting unit detects moving motion in which the user pinches and moves the target object, the display control unit is configured to move a 3D position of the target object in accordance with the moving motion.

5. The user interface device according to claim 1, wherein when the motion detecting unit detects page-turning motion in which the user turns a page of the target object while pinching the target object, the display control unit is configured to turn the page of the target object.

6. The user interface device according to claim 1, wherein when the motion detecting unit detects flicking motion in which the user flicks the object with the fingers of the user, the display control unit is configured to move the object in a direction in which the target object has been flicked.

7. The user interface device according to claim 1, wherein the motion detecting unit is configured to detect a 3D position of each of fingertips of the user based on the finger motion model, and
when a portion of the target object is present between the fingertips and a distance between the fingertips is less than or equal to a thickness of the target object, the motion detecting unit is configured to determine that the pinching motion has been performed.

8. The user interface device according to claim 1, wherein when the finger motion model has a shape which matches a shape of a predetermined pinching motion model, the motion detecting unit is configured to determine that the pinching motion has been performed.

9. A display object operating method comprising:
displaying an object in a display space, the object being either a two-dimensional (2D) object or a three-dimensional (3D) object;
measuring 3D coordinates of fingers of a user in the display space;
detecting motion of the fingers of the user relative to the object, based on the 3D coordinates of the fingers of the user measured in the measuring; and
changing display content according to a detection result obtained in the detecting,
wherein when the motion detecting step detects a ripping motion by the user of a target object, the changing display content step deletes the target object, the ripping motion being a motion in which two pinch positions detected on the target object separate from each other,
in the motion detecting step a pinching motion is detected in which the user pinches the target object which is the object, based on the 3D coordinates of the fingers of the user measured by the measuring step, and in the motion detecting step a finger motion model is generated by determining portions of a part of the user which are narrower than a predetermined threshold to be the fingers, and the pinching motion is detected based on the finger motion model.

10. A non-transitory computer-readable recording medium for use in a computer, the recording medium having a computer program recorded thereon for causing the computer to execute the display object operating method according to claim 9.

11. An integrated circuit comprising:

a display unit configured to display an object in a display space, the object being either a two-dimensional (2D) object or a three-dimensional (3D) object;

a sensor unit configured to measure 3D coordinates of fingers of a user in the display space;

a motion detecting unit configured to detect motion of the fingers of the user relative to the object, based on the 3D coordinates of the fingers of the user measured by the sensor unit; and a display control unit configured to change display content displayed by the display unit, according to a detection result obtained by the motion detecting unit, wherein when the motion detecting unit detects a ripping motion by the user of a target object, the display control unit is configured to delete the target object, the ripping motion being a motion in which two pinch positions detected on the target object separate from each other, the motion detecting unit is configured to detect a pinching motion in which the user pinches the target object which is the object, based on the 3D coordinates of the fingers of the user measured by the sensor unit, and the motion detecting unit is configured to generate a finger motion model by determining portions of a part of the user which are narrower than a predetermined threshold to be the fingers, and detect the pinching motion based on the finger motion model.

* * * * *